US 6,670,410 B2

(12) United States Patent
Ishizuka et al.

(10) Patent No.: US 6,670,410 B2
(45) Date of Patent: Dec. 30, 2003

(54) COLOR COMPOSITION, INK FOR INK-JET RECORDING AND INK-JET RECORDING METHOD

(75) Inventors: Takahiro Ishizuka, Kanagawa (JP); Hirohisa Hokazono, Kanagawa (JP); Junichi Yamanouchi, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 26 days.

(21) Appl. No.: 09/862,423

(22) Filed: May 23, 2001

(65) Prior Publication Data

US 2002/0025994 A1 Feb. 28, 2002

(30) Foreign Application Priority Data

May 23, 2000 (JP) ........................ 2000-151886

(51) Int. Cl.$^7$ ................... C09D 11/10; C08L 33/14; C08K 5/3415; C08K 5/3432; C08K 5/3445; C08K 5/3462; C08K 5/3472; C08K 5/3477
(52) U.S. Cl. .................. 523/160; 524/86; 524/91; 524/94; 524/100; 524/104; 524/556
(58) Field of Search ................. 523/160, 161, 523/200, 205; 524/86, 87, 91, 94, 104, 556, 100; 106/31.27

(56) References Cited

U.S. PATENT DOCUMENTS

| | | | | |
|---|---|---|---|---|
| 5,508,421 A | * | 4/1996 | Suzuki et al. | 548/262.4 |
| 5,998,501 A | * | 12/1999 | Tsutsumi et al. | 523/160 |
| 6,031,019 A | * | 2/2000 | Tsutsumi et al. | 523/160 |
| 6,235,096 B1 | * | 5/2001 | Meyrick et al. | 106/31.43 |
| 6,346,358 B1 | * | 2/2002 | Cheng | 430/137.14 |
| 6,379,443 B1 | * | 4/2002 | Komatsu et al. | 106/31.58 |
| 6,467,871 B1 | * | 10/2002 | Moffatt et al. | 347/21 |

FOREIGN PATENT DOCUMENTS

| | | |
|---|---|---|
| JP | 56-157468 | 4/1981 |
| JP | 58-45272 | 3/1983 |
| JP | 06-340835 | 12/1994 |
| JP | 09-059552 | 3/1997 |
| JP | 09-111163 | 4/1997 |
| JP | 10-110126 | 4/1998 |
| JP | 11-140362 | 5/1999 |
| WO | WO 98/14523 A1 * | 4/1998 |

* cited by examiner

Primary Examiner—Callie Shosho
(74) Attorney, Agent, or Firm—Burns, Doane, Swecker & Mathis, LLP

(57) ABSTRACT

An ink for ink-jet recording which comprises a color composition prepared by dispersing, in a water-based medium, coloring particulates that contain an oil-soluble dye and a vinyl polymer which is obtained through copolymerization of a monomer represented by general formula (I) as follows:

General formula (I)

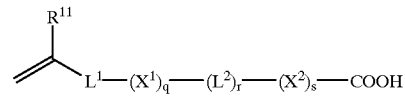

in which general formula (I): $R^{11}$ represents a hydrogen atom, a chlorine atom, or the like; $L^1$ represents —O—, —COO—, or the like; $X^1$ represents —CH$_2$—, —CHR$^{13}$—, or the like; q is 2 or more if $L^1$ is —COO—, and q is 1 or more in other cases; $L^2$ represents —O—, —CO—, or the like; r is 0 or 1; $X^2$ represents —CH$_2$—, —CH$_2$CHR$^{13}$—, or the like; s is from 0 to 18; $R^{12}$ and $R^{15}$ each independently represents a hydrogen atom, or the like; and $R^{13}$ and $R^{14}$ each independently represents a substituted or unsubstituted alkyl group, or the like.

18 Claims, No Drawings

COLOR COMPOSITION, INK FOR INK-JET RECORDING AND INK-JET RECORDING METHOD

BACKGROUND OF THE INVENTION

1. Field of the Invention

The present invention relates to an aqueous color composition containing an oil-soluble dye, to an ink for ink-jet recording containing the color composition, and to an ink-jet recording method in which the ink is used.

2. Description of the Related Art

In recent years, accompanying the more widespread use of computers, ink-jet printers have come to be widely used for printing on paper, film, cloth and the like, not only in offices but in homes as well. Oil-based inks, aqueous inks, and solid inks are known as inks for ink-jet recording. Among these inks, aqueous inks are advantageous from the standpoints of ease of manufacture, handling, odor, safety, and the like, and thus, aqueous inks are mainly used. However, most aqueous inks use a water-soluble dye which dissolves in a molecular state. Thus, aqueous inks have advantages that transparency and color density thereof are high. However, because these dyes are water-soluble, their water resistance is poor. When printing is carried out on so-called regular paper, problems arise in that bleeding occurs such that printing quality markedly deteriorates, and that light resistance is poor.

In order to overcome the above-described problems, Japanese Patent Applications Laid-Open (JP-A) Nos. 56-157468, 4-18468, 10-110126, 10-195355 and the like, for example, have proposed aqueous inks that utilize a pigment and a dispersed dye.

However, with these aqueous inks, although the water resistance is improved to a certain extent, it is still insufficient. There are further problems, in that storage stability of a dispersion of the pigment and the dispersed dye in the aqueous ink is lacking, it is easy for the ink to become clogged in ink discharge ports, and the like. Moreover, in the case of such aqueous inks, generally, the hue is insufficient, and there are problems with color reproducibility due to insufficient color tone.

On the other hand, JP-A Nos. 58-45272, 6-340835, 7-268254, 7-268257, and 7-268260 propose methods of encapsulating dyes in urethane or polyester dispersion particles. JP-A No. 11-140362 proposes a method of coagulating a latex that has been prepared through polymerization in the presence of a carboxylic acid and a chain transfer agent, along with a colorant. However, these methods are still problematic in that hues of inks for ink-jet recording produced according thereto are not good and thus color reproducibility thereof is poor, and, in addition, the dispersion stability and water resistance of a dye-incorporated polymer dispersion are not always good when the dye concentration of the dispersion is increased to a desired level. Further, JP-A Nos. 9-59552, 9-111163, 9-255887, 10-36728, 11-286637 and the like disclose that the color tone can be improved by using a dye in which an aromatic diamine is coupled to a color photographic coupler. However, in these inventions, there are problems in that there is a tendency for particle diameters or a particle diameter distribution of the dispersion to be large, dispersion stability and suitability for printing are insufficient, and the color tone varies in accordance with the type of image-receiving paper.

SUMMARY OF THE INVENTION

An object of the present invention is to provide a color composition in which the particle diameter of the coloring particulates is small, the dispersion stability is excellent, there is little dependency on paper and excellent color formation and color tone are obtained when printing on freely selected paper, and which has excellent water resistance and light resistance, and which is suitable for an aqueous ink for writing, an aqueous printing ink, an ink for information recording, or the like. Another object of the present invention is to provide an ink for ink-jet recording and an ink-jet recording method which are suitable for thermal, piezoelectric, electric field and acoustic ink-jet systems, with which, when printing or the like is carried out using nozzles or the like, there is little clogging of the nozzle tips, in which there is little dependency on paper and excellent color formation and color tone are obtained when printing on a freely selected paper, and in which water resistance and light resistance are excellent.

The object described above can be achieved by the following means:

A first aspect of the present invention is an ink for ink-jet recording which comprises a color composition prepared by dispersing, in a water-based medium, coloring particulates that contain an oil-soluble dye and a vinyl polymer which is obtained through copolymerization of a monomer represented by general formula (I) as follows:

General formula (I)

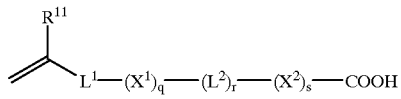

in which general formula (I): $R^{11}$ represents a hydrogen atom, an alkyl group having from 1 to 4 carbon atoms, or a chlorine atom; $L^1$ represents —O—, —COO—, —OCO—, —CONR$^{12}$—, or a substituted or unsubstituted phenylene group; $X^1$ represents —CH$_2$—, —CHR$^{13}$—, —CR$^{13}$R$^{14}$—, —CH$_2$CH$_2$O—, —CH$_2$CHR$^{13}$O—, —CHR$^{13}$CH$_2$O—, a substituted or unsubstituted arylene group, or a substituted or unsubstituted cycloalkylene group; q is 2 or more if $L^1$ is —COO—, and q is 1 or more in other cases; $L^2$ represents —O—, —CO—, —COO—, —OCO—, —CONR$^{12}$—, —NR$^{12}$CO—, —NR$^{12}$COO—, or —NR$^{12}$CONR$^{15}$—; r is 0 or 1; $X^2$ represents —CH$_2$—, —CH$_2$CHR$^{13}$—, —CHR$^{13}$CH$_2$—, a substituted or unsubstituted arylene group, or a substituted or unsubstituted cycloalkylene group; s is from 0 to 18; $R^{12}$ and $R^{15}$ each independently represents a hydrogen atom, a substituted or unsubstituted alkyl group, or a substituted or unsubstituted aryl group; and $R^{13}$ and $R^{14}$ each independently represents a substituted or unsubstituted alkyl group or a substituted or unsubstituted aryl group.

A second aspect of the present invention is a color composition which comprises coloring particulates dispersed in a water-based medium, the coloring particulates containing an oil-soluble dye and a vinyl polymer which is obtained through copolymerization of a monomer represented by the above-described general formula (I).

A third aspect of the present invention is an ink-jet recording method, in which recording is carried out using an ink for ink-jet recording which includes a color composition prepared by dispersing, in a water-based medium, coloring particulates that contain an oil-soluble dye and a vinyl polymer which is obtained through copolymerization of a monomer represented by the above-described general formula (I).

DESCRIPTION OF THE PREFERRED EMBODIMENTS

The color composition, the ink for ink-jet recording, and the ink-jet recording method of the invention are described below.

[Color Composition]

The color composition of the invention is prepared by dispersing coloring particulates, which contain an oil-soluble dye and a vinyl polymer, in a water-based medium.

Oil-soluble Dye

Among oil-soluble dyes which can be used in the present invention, a freely selected dye can be used for a yellow dye. Examples of the yellow dye include aryl- or heterylazo dyes having, as a coupling component thereof, a phenol, a naphthol, an aniline, a pyrazolone, a pyridone, or a closed chain type active methylene compound; azomethine dyes having, as the coupling component thereof, a closed type active methylene compound; methine dyes such as benzylidene dyes, monomethineoxonol dyes, and the like; quinone dyes such as naphthoquinone dyes, anthraquinone dyes, and the like; and the like. Other types of dyes which can be used are quinophthalone dyes, nitro/nitroso dyes, acridine dyes, acridinone dyes, and the like.

Among the oil-soluble dyes which can be used in the present invention, a freely selected dye can be used for a magenta dye. Examples of the magenta dye include aryl- or heterylazo dyes having, as the coupling component thereof, a phenol, a naphthol, or an aniline; azomethine dyes having, as the coupling component thereof, a pyrazolone or a pyrazotriazole; methine dyes such as arylidene dyes, styryl dyes, merocyanine dyes, and oxonol dyes; carbonium dyes such as diphenylmethane dyes, triphenylmethane dyes, xanthene dyes; quinone dyes such as naphthoquinone, anthraquinone, anthrapyridone and the like; condensed polycyclic dyes such as dioxazine dyes and the like; and the like.

Among the oil-soluble dyes which can be used in the present invention, a freely selected dye can be used for a cyan dye. Examples of the cyan dye include indoaniline dyes, indophenol dyes, and azomethine dyes having a pyrrolotriazole as the coupling component thereof; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl- or heterylazo dyes having, as the coupling component thereof, a phenol, a naphthol, or an aniline; indigo/thioindigo dyes; and the like.

Each of the aforementioned dyes may first provide a color, yellow, magenta or cyan, when a chromophore portion thereof dissociates. A counter cation in this case may be an alkali metal, an inorganic cation such as ammonium, or an organic cation such as pyridinium or a quaternary ammonium salt, or may be a polymer cation having one of these cations in a partial structure.

Among these dyes, dyes which are generated from couplers and developing chemicals for photographic materials are effective. Dyes represented by following general formula (II) are preferable as such dyes.

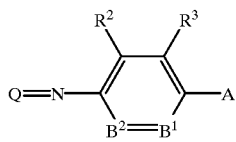

General formula (II)

In the general formula (II), A represents —NR$^4$R$^5$ or a hydroxyl group. R$^4$ and R$^5$ each independently represents a hydrogen atom, an alkyl group, an aryl group, or a heterocyclic group.

The alkyl group may be a linear, branched or cyclic, substituted or unsubstituted alkyl group. In addition to this, the alkyl group includes a cycloalkyl group, a bicycloalkyl group, a tricyclo-structured group having a multi-ring structure, or the like.

Preferably, the alkyl group has from 1 to 30 carbon atoms. More preferred are, for example, a methyl group, an ethyl group, an n-propyl group, an isopropyl group, a t-butyl group, an n-octyl group, an eicosyl group, a 2-chloroethyl group, a 2-cyanoethyl group, a 2-ethylhexyl group, and the like.

The cycloalkyl group is preferably a substituted or unsubstituted cycloalkyl group having from 3 to 30 carbon atoms. For example, more preferred are a cyclohexyl group, a cyclopentyl group, a 4-n-dodecylcylcohexyl group, and the like.

The bicycloalkyl group is preferably a substituted or unsubstituted bicycloalkyl group having from 5 to 30 carbon atoms, that is, a monovalent group derived from a bicycloalkane having from 5 to 30 carbon atoms by removal of one hydrogen atom. For example, more preferred are a bicyclo[1,2,2]heptane-2-yl group, a bicyclo[2,2,2]octane-3-yl group, and the like.

The above also applies to alkyl groups in substituents mentioned hereinunder (for example, the alkyl group of an alkylthio group).

The aryl group is preferably a substituted or unsubstituted aryl group having from 6 to 30 carbon atoms. For example, more preferred are a phenyl group, a p-tolyl group, a naphthyl group, an m-chlorophenyl group, an o-hexadecanoylaminophenyl group, and the like.

The heterocyclic group is preferably a monovalent group derived from a 5-membered or 6-membered, substituted or unsubstituted, aromatic or non-aromatic heterocyclic compound by removal of one hydrogen atom; more preferably, a 5-membered or 6-membered aromatic heterocyclic group having from 3 to 30 carbon atoms. For example, even more preferred are a 2-furyl group, a 2-thienyl group, a 2-pyrimidinyl group, and a 2-benzothiazolyl group.

If R$^4$ and R$^5$ are each an alkyl group, an aryl group or a heterocyclic group, the groups of R$^4$ and R$^5$ may be further substituted. This substituent includes, for example, a halogen atom, an alkyl group (including a cycloalkyl group and a bicycloalkyl group), an alkenyl group (including a cycloalkenyl group and a bicycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkyl- or arylsulfonylamino group, a mercapto group, an alkylthio group, an arylthio group, a heterocyclic thio group, a sulfamoyl group, a sulfo group, an alkyl- or arylsulfinyl group, an alkyl- or arylsulfonyl group, an acyl group, an aryloxycarbonyl group, an alkoxycarbonyl group, a carbamoyl group, an aryl- or heterocyclic azo group, an imido group, a phosphino group, a phosphinyl group, a phosphinyloxy group, a phosphinylamino group, a silyl group, or the like.

Preferably, the halogen atom is, for example, a chlorine atom, a bromine atom or an iodine atom.

The alkyl group may be a linear, branched or cyclic, substituted or unsubstituted alkyl group. In addition to this, the alkyl group includes a cycloalkyl group, a bicycloalkyl group, a tricyclo-structured group having a multi-ring structure, and the like.

The alkyl group preferably has from 1 to 30 carbon atoms. More preferred are, for example, a methyl group, an ethyl group, an n-propyl group, an isopropyl group, a t-butyl group, an n-octyl group, an eicosyl group, a 2-chloroethyl group, a 2-cyanoethyl group, a 2-ethylhexyl group, and the like.

The cycloalkyl group is preferably a substituted or unsubstituted cycloalkyl group having from 3 to 30 carbon atoms. For example, more preferred are a cyclohexyl group, a cyclopentyl group, a 4-n-dodecylcyclohexyl group, and the like.

The bicycloalkyl group is preferably a substituted or unsubstituted bicycloalkyl group having from 5 to 30 carbon atoms, that is, a monovalent group derived from a bicycloalkane having from 5 to 30 carbon atoms by removal of one hydrogen atom. For example, more preferred are a bicyclo[1,2,2]heptane-2-yl group, a bicyclo[2,2,2]octane-3-yl group, and the like.

The same also applies to alkyl groups in substituents mentioned hereinunder (for example, the alkyl group of an alkylthio group).

The alkenyl group may be a linear, branched or cyclic, substituted or unsubstituted alkenyl group. In addition to this, the alkenyl group includes a cycloalkenyl group, and a bicycloalkenyl group.

The alkenyl group is preferably a substituted or unsubstituted alkenyl group having from 2 to 30 carbon atoms. More preferred are, for example, a vinyl group, an allyl group, a prenyl group, a geranyl group, an oleyl group, and the like.

The cycloalkenyl group is preferably a substituted or unsubstituted cycloalkenyl group having from 3 to 30 carbon atoms, that is, a monovalent group derived from a cycloalkene having from 3 to 30 carbon atoms by removal of one hydrogen atom. For example, more preferred are a 2-cyclopentene-1-yl group, a 2-cyclohexene-1-yl group, and the like.

The bicycloalkenyl group may be substituted or unsubstituted. For this, preferred is a substituted or unsubstituted bicycloalkenyl group having from 5 to 30 carbon atoms, that is, a monovalent group derived from a bicycloalkene having one double bond by removal of one hydrogen atom. For example, more preferred are a bicyclo[2,2,1]hepto-2-ene-1-yl group, a bicyclo[2,2,2]octo-2-ene-4-yl group, and the like.

The alkynyl group is preferably a substituted or unsubstituted alkynyl group having from 2 to 30 carbon atoms. For example, more preferred are an ethynyl group, a propargyl group, a trimethylsilylethynyl group, and the like.

The aryl group is preferably a substituted or unsubstituted aryl group having from 6 to 30 carbon atoms. For example, more preferred are a phenyl group, a p-tolyl group, a naphthyl group, a m-chlorophenyl group, an o-hexadecanoylaminophenyl group, and the like.

The heterocyclic group is preferably a monovalent group derived from a 5-membered or 6-membered, substituted or unsubstituted, aromatic or non-aromatic heterocyclic compound by removal of one hydrogen atom; more preferably, a 5-membered or 6-membered aromatic heterocyclic group having from 3 to 30 carbon atoms. For example, even more preferred are a 2-furyl group, a 2-thienyl group, a 2-pyrimidinyl group, a 2-benzothiazolyl group, and the like.

The alkoxy group is preferably a substituted or unsubstituted alkoxy group having from 1 to 30 carbon atoms. For example, more preferred are a methoxy group, an ethoxy group, an isopropoxy group, a t-butoxy group, an n-octyloxy group, a 2-methoxyethoxy group, and the like.

The aryloxy group is preferably an unsubstituted or substituted aryloxy group having from 6 to 30 carbon atoms. For example, more preferred are a phenoxy group, a 2-methylphenoxy group, a 4-t-butylphenoxy group, a 3-nitrophenoxy group, a 2-tetradecanoylaminophenoxy group, and the like.

The silyloxy group preferably has from 3 to 20 carbon atoms. For example, more preferred are a trimethylsilyloxy group, a t-butyldimethylsilyloxy group, and the like.

The heterocyclic oxy group is preferably a substituted or unsubstituted heterocyclic oxy group having from 2 to 30 carbon atoms. More preferred are a 1-phenyltetrazole-5-oxy group, a 2-tetrahydropyranyloxy group, and the like.

The acyloxy group is preferably a formyloxy group, a substituted or unsubstituted alkylcarbonyloxy group having from 2 to 30 carbon atoms, or a substituted or unsubstituted arylcarbonyloxy group having from 6 to 30 carbon atoms. For example, more preferred are a formyloxy group, an acetyloxy group, a pivaloyloxy group, a stearoyloxy group, a benzoyloxy group, a p-methoxyphenylcarbonyloxy group, and the like.

The carbamoyloxy group is preferably a substituted or unsubstituted carbamoyloxy group having from 1 to 30 carbon atoms. For example, more preferred are an N,N-dimethylcarbamoyloxy group, an N,N-diethylcarbamoyloxy group, a morpholinocarbonyloxy group, an N,N-di-n-octylaminocarbonyloxy group, an N-n-octylcarbamoyloxy group, and the like.

The alkoxycarbonyloxy group is preferably a substituted or unsubstituted alkoxycarbonyloxy group having from 2 to 30 carbon atoms. For example, more preferred are a methoxycarbonyloxy group, an ethoxycarbonyloxy group, a t-butoxycarbonyloxy group, an n-octoxycarbonyloxy group, and the like.

The aryloxycarbonyloxy group is preferably a substituted or unsubstituted aryloxycarbonyloxy group having from 7 to 30 carbon atoms. For example, more preferred are a phenoxycarbonyloxy group, a p-methoxyphenoxycarbonyloxy group, a p-n-hexadecyloxyphenoxycarbonyloxy group, and the like.

The amino group includes not only an unsubstituted amino group but also a substituted or alkylamino group having from 1 to 30 carbon atoms, and a substituted or unsubstituted anilino group having from 6 to 30 carbon atoms. For this, for example, preferred are an amino group, a methylamino group, a dimethyl amino group, an anilino group, an N-methylanilino group, a diphenylamino group, and the like.

The acylamino group is preferably a formylamino group, a substituted or unsubstituted alkylcarbonylamino group having from 1 to 30 carbon atoms, or a substituted or unsubstituted arylcarbonylamino group having from 6 to 30 carbon atoms. For example, more preferred are a formylamino group, an acetylamino group, a pivaloylamino group, a lauroylamino group, a benzoylamino group, a 3,4,5-tri-n-octyloxyphenyl carbonylamino group, and the like.

The aminocarbonylamino group is preferably a substituted or unsubstituted aminocarbonylamino group having from 1 to 30 carbon atoms. For example, more preferred are a carbamoylamino group, an N,N-dimethylaminocarbonylamino group, an N,N-diethylaminocarbonylamino group, a morpholinocarbonylamino group, and the like.

The alkoxycarbonylamino group is preferably a substituted or unsubstituted alkoxycarbonylamino group having from 2 to 30 carbon atoms. For example, more preferred are a methoxycarbonylamino group, an ethoxycarbonylamino group, a t-butoxycarbonylamino group, an n-octadecyloxycarbonylamino group, an N-methylmethoxycarbonylamino group, and the like.

The aryloxycarbonylamino group is preferably a substituted or unsubstituted aryloxycarbonylamino group having from 7 to 30 carbon atoms. For example, more preferred are a phenoxycarbonylamino group, a p-chlorophenoxycarbonylamino group, a m-n-octyloxyphenoxycarbonylamino group, and the like.

The sulfamoylamino group is preferably a substituted or unsubstituted sulfamoylamino group having from 0 to 30 carbon atoms. For example, more preferred are a sulfamoylamino group, an N,N-dimethylaminosulfonylamino group, an N-n-octylaminosulfonylamino group, and the like.

The alkyl- or arylsulfonylamino group is preferably a substituted or unsubstituted alkylsulfonylamino group having from 1 to 30 carbon atoms, or a substituted or unsubstituted arylsulfonylamino group having from 6 to 30 carbon atoms. For example, more preferred are a methylsulfonylamino group, a butylsulfonylamino group, a phenylsulfonylamino group, a 2,3,5-trichlorophenylsulfonylamino group, a p-methylphenylsulfonylamino group, and the like.

The alkylthio group is preferably a substituted or unsubstituted alkylthio group having from 1 to 30 carbon atoms. For example, more preferred is a methylthio group, an ethylthio group, an n-hexadecylthio group, and the like.

The arylthio group is preferably a substituted or unsubstituted arylthio group having from 6 to 30 carbon atoms. For example, more preferred are a phenylthio group, a p-chlorophenylthio group, a m-methoxyphenylthio group, and the like.

The heterocyclic thio group is preferably a substituted or unsubstituted heterocyclic thio group having from 2 to 30 carbon atoms. For example, more preferred are a 2-benzothiazolylthio group, a 1-phenyltetrazole-5-ylthio group, and the like.

The sulfamoyl group is preferably a substituted or unsubstituted sulfamoyl group having from 0 to 30 carbon atoms. For example, more preferred are an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, an N-(N'-phenylcarbamoyl)sulfamoyl group, and the like.

The alkyl- or arylsulfinyl group is preferably a substituted or unsubstituted alkylsulfinyl group having from 1 to 30 carbon atoms, or a substituted or unsubstituted arylsulfinyl group having from 6 to 30 carbon atoms. For example, more preferred are a methylsulfinyl group, an ethylsulfinyl group, a phenylsulfinyl group, a p-methylphenylsulfinyl group, and the like.

The alkyl- or arylsulfonyl group is preferably a substituted or unsubstituted alkylsulfonyl group having from 1 to 30 carbon atoms, or a substituted or unsubstituted arylsulfonyl group having from 6 to 30 carbon atoms. For example, more preferred are a methylsulfonyl group, an ethylsulfonyl group, a phenylsulfonyl group, a p-methylphenylsulfonyl group, and the like.

The acyl group is preferably a formyl group, a substituted or unsubstituted alkylcarbonyl group having from 2 to 30 carbon atoms, or a substituted or unsubstituted arylcarbonyl group having from 7 to 30 carbon atoms. For example, more preferred are an acetyl group, a pivaloyl group, a 2-chloroacetyl group, a stearoyl group, a benzoyl group, a p-n-octyloxyphenylcarbonyl group, and the like.

The aryloxycarbonyl group is preferably a substituted or unsubstituted aryloxycarbonyl group having from 7 to 30 carbon atoms. For example, more preferred are a phenoxycarbonyl group, an o-chlorophenoxycarbonyl group, a m-nitrophenoxycarbonyl group, a p-t-butylphenoxycarbonyl group, and the like.

The alkoxycarbonyl group is preferably a substituted or unsubstituted alkoxycarbonyl group having from 2 to 30 carbon atoms. For example, more preferred is a methoxycarbonyl group, an ethoxycarbonyl group, a t-butoxycarbonyl group, an n-octadecyloxycarbonyl group, and the like.

The carbamoyl group is preferably a substituted or unsubstituted carbamoyl group having from 1 to 30 carbon atoms. For example, more preferred is a carbamoyl group, an N-methylcarbamoyl group, an N,N-dimethylcarbamoyl group, an N,N-di-n-octylcarbamoyl group, an N-(methylsulfonyl)carbamoyl group, and the like.

The aryl- or heterocyclic azo group is preferably a substituted or unsubstituted arylazo group having from 6 to 30 carbon atoms, or a substituted or unsubstituted heterocyclic azo group having from 3 to 30 carbon atoms. For example, more preferred are a phenylazo group, a p-chlorophenylazo group, a 5-ethylthio-1,3,4-thiadiazole-2-ylazo group, and the like.

The imido group is preferably an N-succinimido group, an N-phthalimido group, or the like.

The phosphino group is preferably a substituted or unsubstituted phosphino group having from 2 to 30 carbon atoms. For example, more preferred are a dimethylphosphino group, a diphenylphosphino group, a methylphenoxyphosphino group, and the like.

The phosphinyl group is preferably a substituted or unsubstituted phosphinyl group having from 2 to 30 carbon atoms. For example, more preferred are a phosphinyl group, a dioctyloxyphosphinyl group, a diethoxyphosphinyl group, and the like.

The phosphinyloxy group is preferably a substituted or unsubstituted phosphinyloxy group having from 2 to 30 carbon atoms. For example, more preferred are a diphenoxyphosphinyloxy group, a dioctyloxyphosphinyloxy group, and the like.

The phosphinylamino group is preferably a substituted or unsubstituted phosphinylamino group having from 2 to 30 carbon atoms. For example, more preferred are a dimethoxyphosphinylamino group, a dimethylaminophosphinylamino group, and the like.

The silyl group is preferably a substituted or unsubstituted silyl group having from 3 to 30 carbon atoms. For example, more preferred are a trimethylsilyl group, a t-butyldimethylsilyl group, a phenyldimethylsilyl group, and the like.

In the general formula (II), A is preferably $-NR^4R^5$. Preferably, $R^4$ and $R^5$ each independently represents a hydrogen atom, an alkyl group, a substituted alkyl group, an aryl group, or a substituted aryl group; more preferably a hydrogen atom, an alkyl group, or a substituted alkyl group; even more preferably an alkyl group having from 1 to 18 carbon atoms or a substituted alkyl group having from 1 to 18 carbon atoms.

In the general formula (II), $B^1$ represents $=C(R^6)-$ or $=N-$. $B^2$ represents $-C(R^7)=$ or $-N=$. It is preferable that $B^1$ and $B^2$ are not simultaneously $-N=$, and a case in which $B^1$ is $=C(R^6)-$ and $B^2$ is $-C(R^7)=$ is more preferable.

In the general formula (II), $R^2$, $R^3$, $R^6$ and $R^7$ each independently represents a hydrogen atom or a substituent. The substituent preferably has from 1 to 30 carbon atoms. Specific examples are the same as those given as examples of substituents of the groups represented by $R^4$ and $R^5$.

Preferably, $R^2$ is a hydrogen atom, an alkyl group having from 1 to 20 carbon atoms, an alkoxy group, an acylamino group, or an ureido group, more preferably a hydrogen atom or an alkyl group having from 1 to 3 carbon atoms.

Preferably, $R^3$, $R^6$ and $R^7$ are each a hydrogen atom, an alkyl group having from 1 to 20 carbon atoms, an alkoxy group, an acylamino group, or an ureido group, more preferably a hydrogen atom, or an alkyl group having from 1 to 3 carbon toms, even more preferably a hydrogen atom.

$R^2$ and $R^3$; $R^3$ and $R^4$; $R^4$ and $R^5$; $R^5$ and $R^6$; and $R^6$ and $R^7$ may be bonded to each other to form rings.

In the above general formula (II), Q represents an atomic group which is necessary for the compound expressed by general formula (II) to have absorption in the visible range and/or the near-infrared range. More specific explanation is given in Japanese Patent Application No. 2000-80259.

Preferable examples of the atomic group are (Cp-1) through (Cp-28) in Japanese Patent Application No. 2000-80259.

At the position marked with * therein, the group of (Cp-1) through (Cp-28) bonds to the other group as Q in the general formula (II).

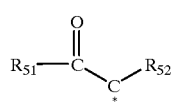
(Cp-1)

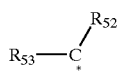
(Cp-2)

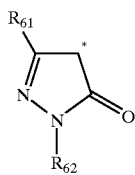
(Cp-3)

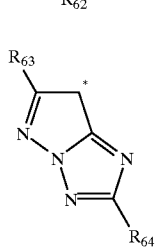
(Cp-4)

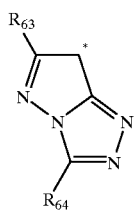
(Cp-5)

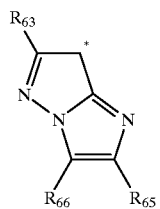
(Cp-6)

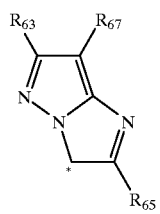
(Cp-7)

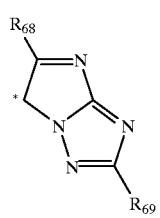
(Cp-8)

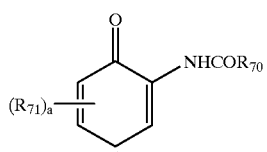
(Cp-9)

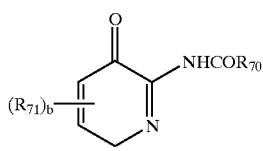
(Cp-10)

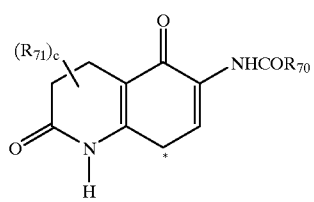
(Cp-11)

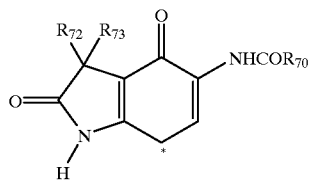
(Cp-12)

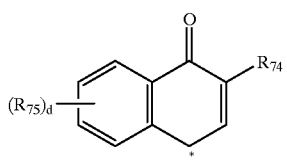
(Cp-13)

-continued (Cp-14) 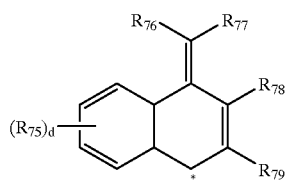

(Cp-15) 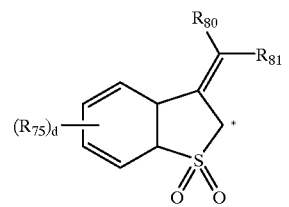

(Cp-16) 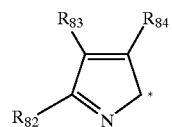

(Cp-17) 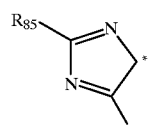

(Cp-18) 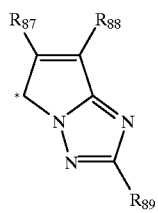

(Cp-19) 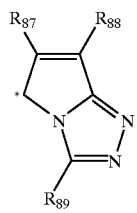

(Cp-20) 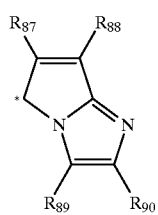

(Cp-21) 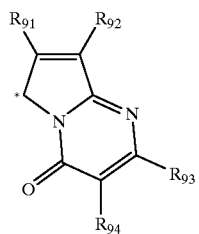

(Cp-22) 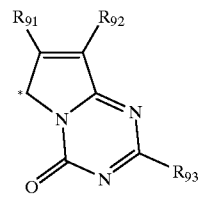

(Cp-23) 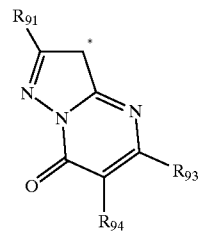

(Cp-24) 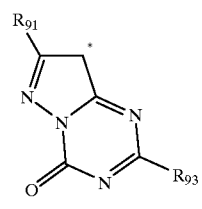

(Cp-25) 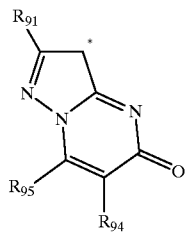

(Cp-26) 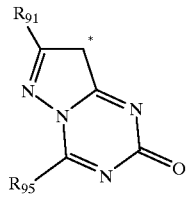

(Cp-27) 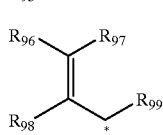

(Cp-28) 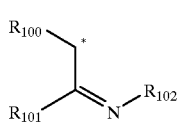

(Cp-1) through (Cp-28) are described in detail hereinunder.

In the formula (Cp-1), $R_{51}$ represents an alkyl group, an aryl group, a heterocyclic group, or an alkoxy group; $R_{52}$ represents a carbamoyl group or a cyano group. Preferably, $R_{51}$ is a t-butyl group, a 1-ethylcyclopropyl group, a 1-methylcyclopropyl group, a 1-benzylcyclopropyl group, a substituted or unsubstituted phenyl group, a substituted or unsubstituted 1-indolinyl group, or a substituted or unsubstituted indol-3-yl group; and $R_{52}$ is an N-arylcarbamoyl group or a cyano group.

In the formula (Cp-2), $R_{53}$ represents an aryl group or a heterocyclic group; and $R_{52}$ has the same meaning as $R_{52}$ in (Cp-1). Preferably, $R_{53}$ is a substituted or unsubstituted phenyl group, or a substituted or unsubstituted heterocyclic group (more preferably, a thiazol-2-yl, benzothiazol-2-yl, oxazol-2-yl, benzoxazol-2-yl, 1,2,4-oxadiazol-3 (or 5)-yl, 1,3,4-oxadiazol-2 (or 5)-yl, 1,2,4-thiadiazol-3 (or 5)-yl, 1,3,4-thiadiazol-2 (or 5)-yl, pyrazol-3-yl, indazol-3-yl, 1,2,4-triazol-3-yl, 2-pyridyl, 2-pyrimidinyl, 2-pyrazinyl, quinazolin-2-yl, or quinazolin-4-yl group); and $R_{52}$ is a cyano group.

In the formula (Cp-3), $R_{61}$ represents an alkyl group, an aryl group, a heterocyclic group, an acylamino group, an amino group, an alkoxy group, an aryloxy group, an alkylthio group, an arylthio group, an aminocarbonylamino group, or an alkoxycarbonylamino group. $R_{62}$ represents an alkyl group, an aryl group, or a heterocyclic group. Preferably, $R_{61}$ is an alkyl group, an acylamino group, an amino group, an aminocarbonylamino group, or an alkoxycarbonylamino group; and $R_{62}$ is an aryl group or a heterocyclic group. More preferably, $R_{61}$ is an acylamino group or an N-arylamino group; and $R_{62}$ is an aryl group.

In the formulae (Cp-4) and (Cp-5), $R_{63}$ and $R_{64}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, or an alkoxycarbonylamino group. Preferably, $R_{63}$ is an alkyl group, an aryl group, an alkoxy group, or an aryloxy group; and $R_{64}$ is an alkyl group or an aryl group. More preferably, $R_{63}$ is a methyl group, a t-butyl group, or a substituted or unsubstituted phenyl group.

In the formulae (Cp-6) and (Cp-7), $R_{63}$ has the same meaning as above; and $R_{65}$, $R_{66}$ and $R_{67}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group, or a carbamoyl group. Preferably, $R_{63}$ is an alkyl group, an aryl group, an alkoxy group, or an aryloxy group; and $R_{65}$, $R_{66}$ and $R_{67}$ each are a hydrogen atom, an alkyl group, an aryl group, an acyl group, an alkoxycarbonyl group, or a carbamoyl group.

In the formula (Cp-8), $R_{68}$ and $R_{69}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group, or a carbamoyl group. Preferably, $R_{68}$ and $R_{69}$ each are a hydrogen atom, an alkyl group, or an aryl group.

In the formulae (Cp-9), (Cp-10), (Cp-11) and (Cp-12), $R_{70}$ represents an alkyl group, an aryl group or a heterocyclic group; $R_{71}$ represents a halogen atom, an alkyl group, an aryl group, a heterocyclic group, a silyl group, an acylamino group, an alkyl or arylsulfonylamino group, an amino group, an aminocarbonylamino group, an alkylthio group, an arylthio group, an alkoxy group, or an alkoxycarbonylamino group; $R_{72}$ and $R_{73}$ each represent a hydrogen atom or an alkyl group; a indicates an integer falling between 0 and 3; b indicates an integer falling between 0 and 2; c indicates an integer falling between 0 and 4; and when a, b or c is a plural number, $R_{71}$'s may be the same or different. Preferably, $R_{70}$ is an alkyl group or an aryl group; $R_{71}$ is a halogen atom, an alkyl group, or an acylamino group; $R_{72}$ and $R_{73}$ each are a hydrogen atom, a methyl group, or an ethyl group; a is 1 or 2; b is 1 or 2; and c is an integer falling between 0 and 2.

In the formula (Cp-13), $R_{74}$ represents a carbamoyl group, an alkoxycarbonyl group, a cyano group, a sulfamoyl group, an acylamino group, an aminocarbonylamino group, an alkoxycarbonylamino group, or an alkyl or arylsulfonylamino group; $R_{75}$ represents a halogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, or an alkoxycarbonylamino group; d indicates an integer falling between 0 and 4; and when d is a plural number, $R_{75}$'s may be the same or different. Preferably, $R_{74}$ is a carbamoyl group, a sulfamoyl group, or an acylamino group; $R_{75}$ is an acylamino group, an alkyl or arylsulfonylamino group, an aminocarbonylamino group, or an alkoxycarbonylamino group; and d is 0 or 1.

In the formula (Cp-14), $R_{75}$ and d have the same meanings as above; $R_{78}$ and $R_{79}$ have the same meanings as $R_{75}$; $R_{76}$ and $R_{77}$ each represent a cyano group, a sulfamoyl group, an alkyl or arylsulfonyl group, an acyl group, an alkoxycarbonyl group, or a carbamoyl group. Preferably, $R_{75}$ is a halogen atom, an alkyl group, or an aryl group; d is an integer falling between 0 and 2; $R_{78}$ and $R_{79}$ each are a halogen atom, an alkyl group, or an aryl group; and $R_{76}$ and $R_{77}$ each are a cyano group.

In the formula (Cp-15), $R_{75}$ and d have the same meanings as above; $R_{80}$ and $R_{81}$ each represent a cyano group, a sulfamoyl group, an alkyl or arylsulfonyl group, an acyl group, an alkoxycarbonyl group, or a carbamoyl group. Preferably, $R_{75}$ is a halogen atom, an alkyl group, or an aryl group; d is an integer falling between 0 and 2; and $R_{80}$ and $R_{81}$ each are a cyano group.

In the formula (Cp-16), $R_{82}$, $R_{83}$ and $R_{84}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group, or a carbamoyl group.

In the formula (Cp-17), $R_{85}$ and $R_{86}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group, or a carbamoyl group. Preferably, $R_{85}$ and $R_{86}$ each are a hydrogen atom, an alkyl group, an aryl group, a heterocyclic group, an acylamino group, or an alkyl or arylsulfonylamino group.

In the formulae (Cp-18) through (Cp-20), $R_{87}$ and $R_{88}$ each represent a carbamoyl group, an alkoxycarbonyl group, an aryloxycarbonyl group, a cyano group, a sulfamoyl group, an alkanesulfonyl group, an arenesulfonyl group, or a nitro group; $R_{89}$ and $R_{90}$ each represent a hydrogen atom, an alkyl group, an aryl group, or a heterocyclic group. Preferably, $R_{87}$ is a carbamoyl group, an alkoxycarbonyl group, or a cyano group; $R_{88}$ is a carbamoyl group, an alkoxycarbonyl group, a cyano group, or an alkyl or arylsulfonyl group; $R_{89}$ and $R_{90}$ each are an alkyl group or an aryl group. More preferably, $R_{87}$ is a cyano group; $R_{88}$ is an alkoxycarbonyl group; and $R_{89}$ and $R_{90}$ each are an aryl group.

In the formulae (Cp-21) through (Cp-26), $R_{91}$ and $R_{92}$ each represent an alkyl group, an aryl group, a heterocyclic group, a carbamoyl group, an alkoxycarbonyl group, an aryloxycarbonyl group, a cyano group, a sulfamoyl group, an alkanesulfonyl group, an arenesulfonyl group, or a nitro group; $R_{93}$, $R_{94}$ and $R_{95}$ each represent a hydrogen atom, an alkyl group, an aryl group, a heterocyclic group, an acylamino group, an aminocarbonylamino group, an alkoxycarbonylamino group, an alkyl or arylsulfonylamino group, a halogen atom, an amino group, an alkylthio group, an arylthio group, an alkoxy group, or an aryloxy group. Preferably, $R_{91}$ is an aryl group, a heterocyclic group, a carbamoyl group, an alkoxycarbonyl group or a cyano group; $R_{92}$ is a carbamoyl group, an alkoxycarbonyl group, a cyano group, a sulfamoyl group, or an alkyl or arylsulfonyl group; $R_{93}$, $R_{94}$ and $R_{95}$ each are a hydrogen atom, an alkyl group, an acylamino group, a halogen atom, an amino group, an alkylthio group, or an arylthio group.

In the formula (Cp-27), $R_{97}$, $R_{98}$ and $R_{99}$ each represent a hydrogen atom, a cyano group, a sulfamoyl group, an alkyl or arylsulfonyl group, an acyl group, an alkoxycarbonyl group, or a carbamoyl group; $R_{96}$ represents an amino group, an alkylthio group, an arylthio group, an alkoxy group, or an aryloxy group. Preferably, $R_{97}$, $R_{98}$ and $R_{99}$ each are a hydrogen atom or a cyano group; and $R_{96}$ is an N-arylamino group.

In the formula (Cp-28), $R_{100}$ and $R_{101}$ each represent a hydrogen atom, a perfluoroalkyl group, a cyano group, a nitro group, a sulfamoyl group, an alkyl or arylsulfonyl group, an acyl group, an alkoxycarbonyl group, a carbamoyl group, an alkylthio group, or an arylthio group; $R_{102}$ represents an alkyl group, an aryl group, a heterocyclic group, a sulfamoyl group, an alkyl or arylsulfonyl group, an acyl group, an alkoxycarbonyl group, or a carbamoyl group. Preferably, $R_{100}$ and $R_{101}$ each are a hydrogen atom, a perfluoroalkyl group, a cyano group, a nitro group, an alkyl or arylsulfonyl group, an alkylthio group, or an arylthio group; and $R_{102}$ is an aryl group or a heterocyclic group.

Preferable examples of the groups of $R_{51}$ to $R_{53}$, $R_{61}$ to $R_{69}$, and $R_{70}$ to $R_{102}$ are the same as those mentioned hereinabove for the substituents for the groups of $R^4$ and $R^5$. The groups of $R_{51}$ to $R_{53}$, $R_{61}$ to $R_{69}$, and $R_{70}$ to $R_{102}$ may be optionally substituted, and preferable substituents for them are the same as those mentioned hereinabove for the substituents for the groups of $R^4$ and $R^5$.

Of the groups of (Cp-1) through (Cp-28), preferred are (Cp-1), (Cp-2), (Cp-4), (Cp-5), (Cp-11), (Cp-12), (Cp-18), (Cp-21) and (Cp-22). Especially for magenta dyes, most preferred are pyrazolotriazolazomethine compounds of the general formula (II) with (Cp-4); and for cyan dyes, most preferred are pyrrolotriazolazomethine compounds of the general formula (II) with (Cp-18).

More preferred are pyrrolotriazolazomethine compounds of the general formula (II) with (Cp-18) in which $R_{87}$ is an electron-attracting group having a Hammett's substituent constant $\sigma_p$ of at least 0.30, as their absorption is sharp. Even more preferred are the pyrrolotriazolazomethine compounds in which the sum of the Hammett's substituent constant $\sigma_p$ of $R_{87}$ and $R_{88}$ is at least 0.70, as they exhibit good cyan color.

Preferably, the oil-soluble azomethine dye of the general formula (II) has, as a substituent, at least one non-diffusive group having from 8 to 40 carbon atoms in total, more preferably at least one non-diffusive group having from 10 to 30 carbon atoms in total.

The oil-soluble azomethine dye of the general formula (II) may be a bis-type, tris-type, telomer-type or polymer-type compound having at least two dye skeletons in one molecule. In this case, the range of carbon atoms may be other than those stipulated above.

The oil-soluble azomethine dye represented by general formula (II) may have, in the molecule thereof, an atomic group which has an effect of suppressing color fading. Preferable atomic groups that have the effect of suppressing color fading are atomic groups disclosed in JP-A No. 3-205189.

Specific examples of the oil-soluble azomethine dye of the general formula (II) are mentioned below (Compounds M-1 to M-16, and Compounds C-1 to C-9). However, the oil-soluble dyes usable in the invention are not limited to these concrete examples.

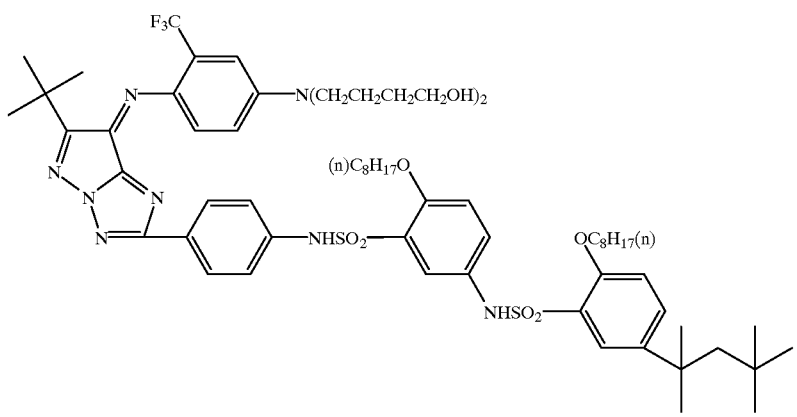

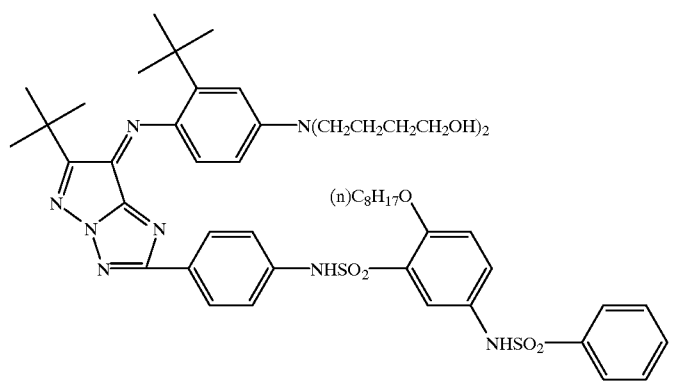

M-3
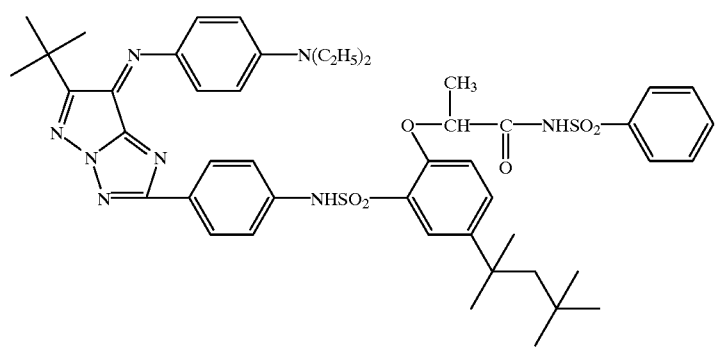
M-4
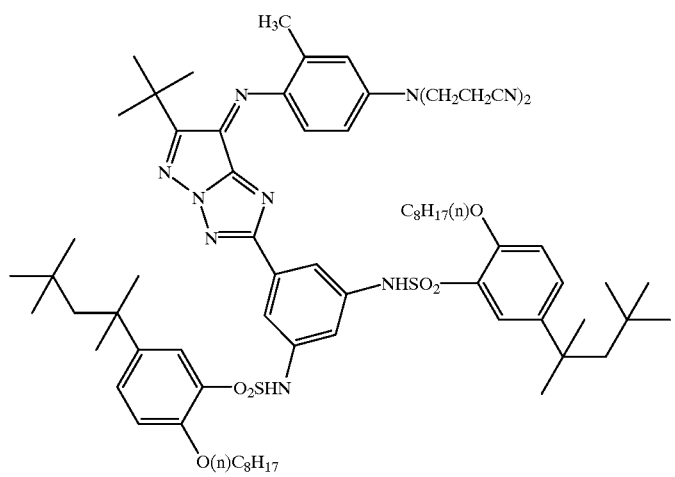
M-5
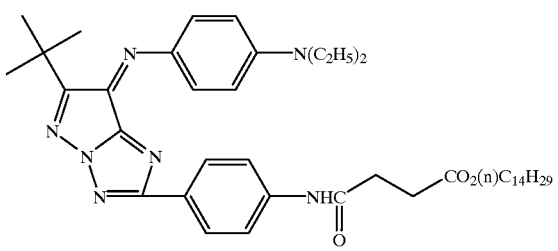
M-6
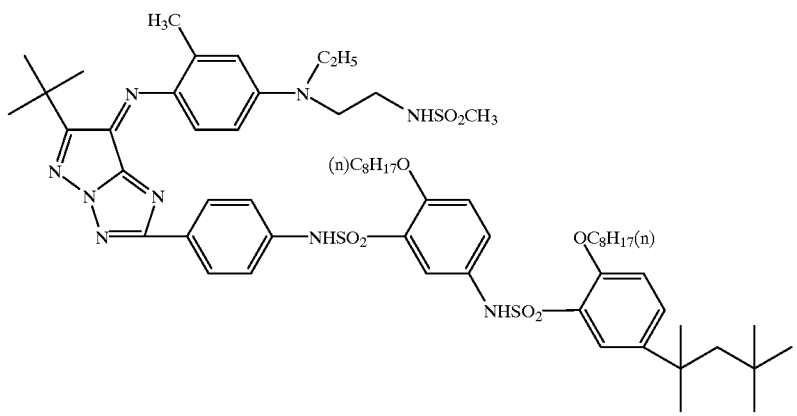

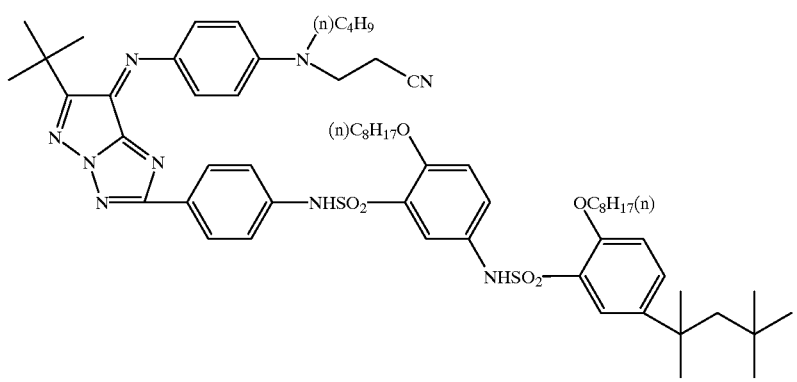
M-7
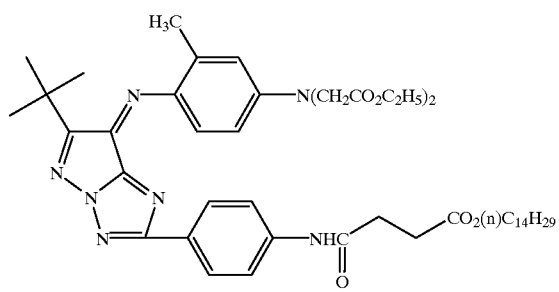
M-8
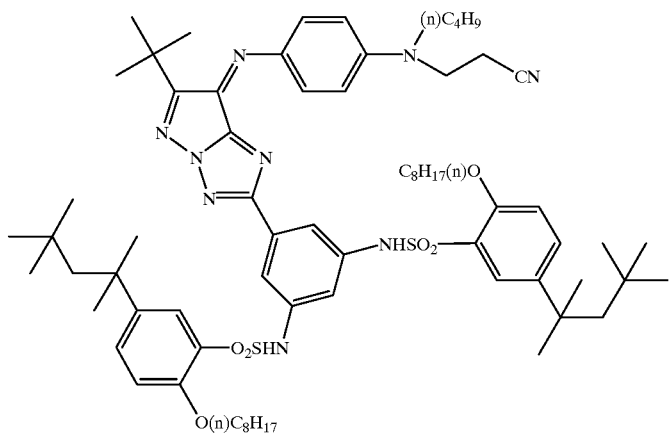
M-9
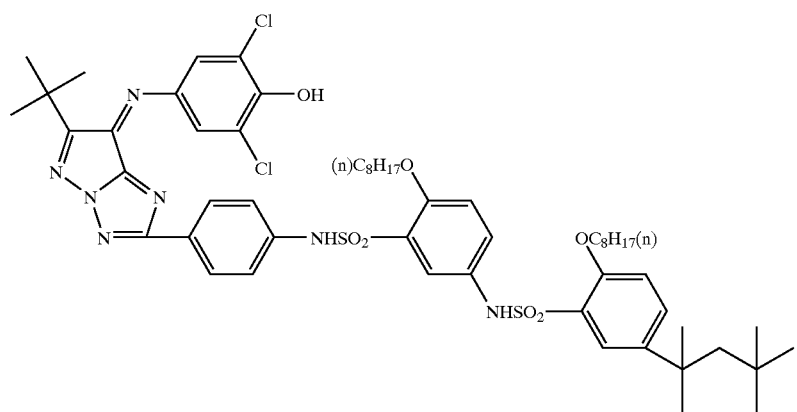
M-10

M-11
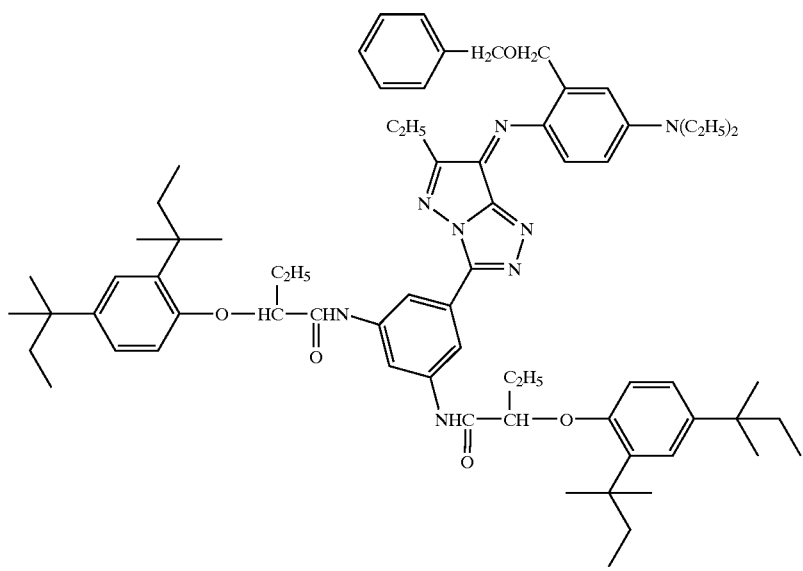
M-12
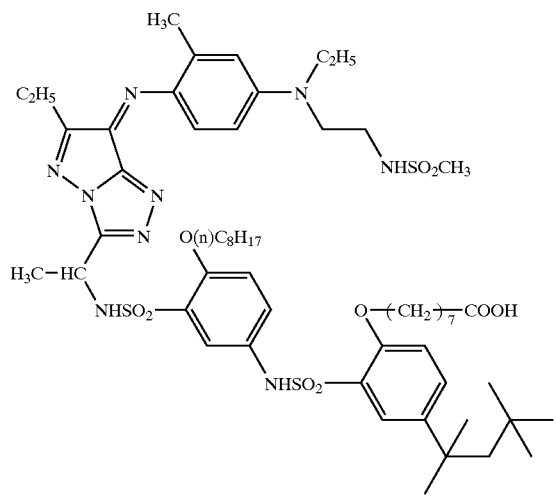
M-13
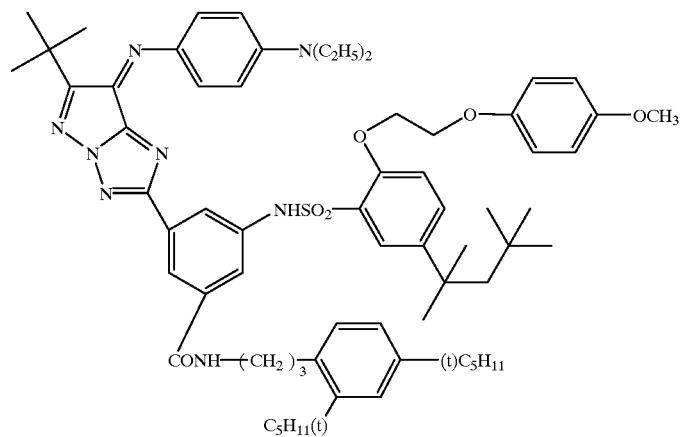

-continued
M-14
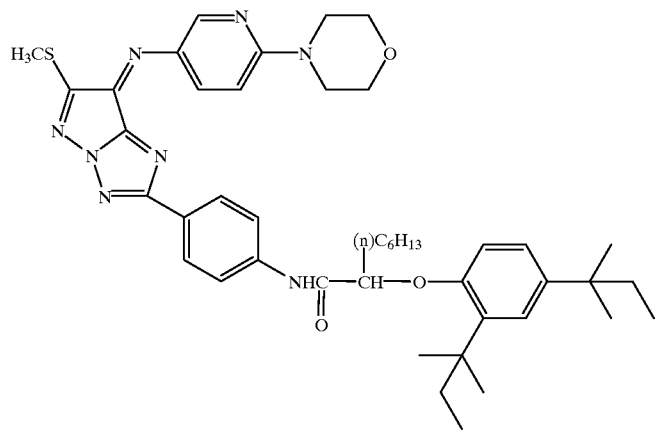
M-15
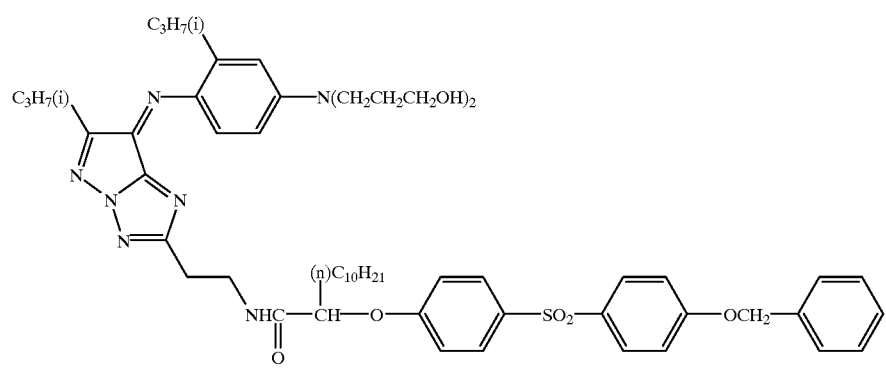
M-16
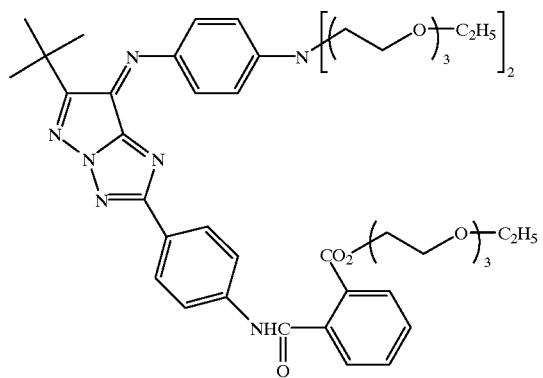

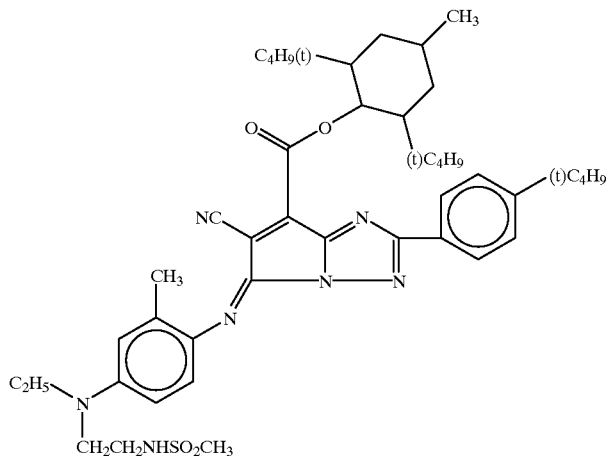
C-1
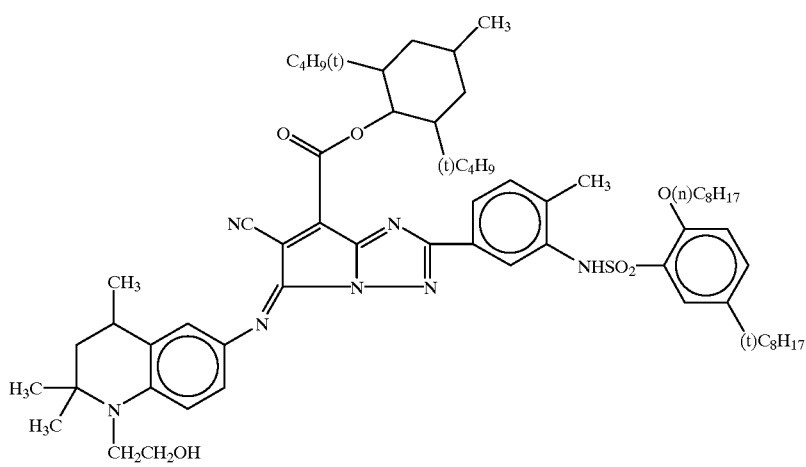
C-2
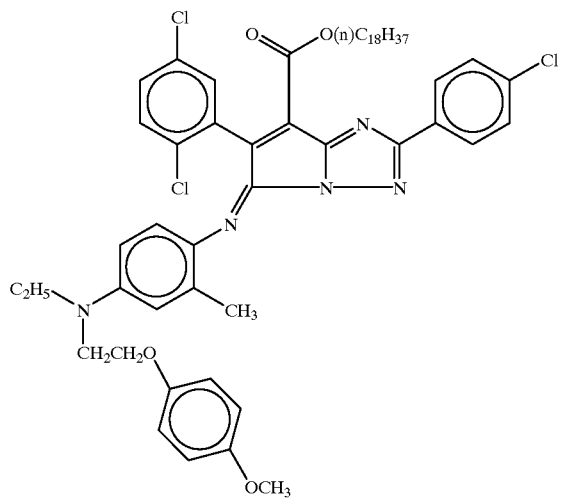
C-3

-continued
C-4
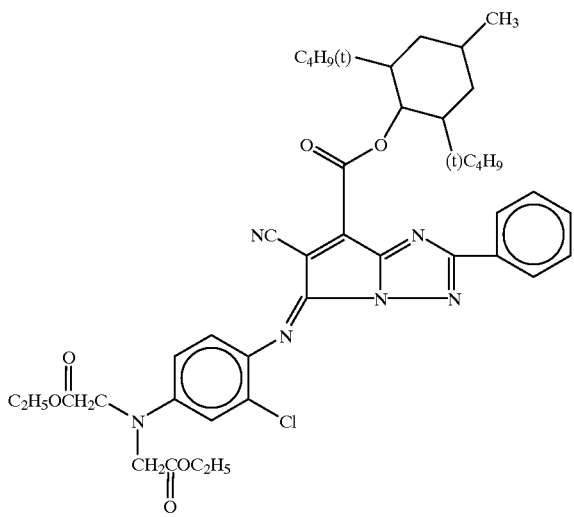
C-5
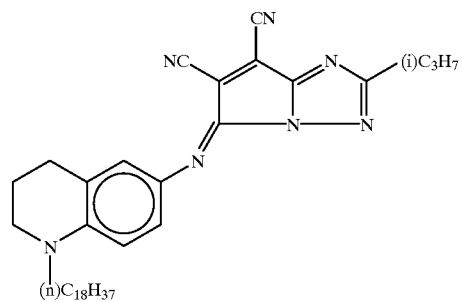
C-6
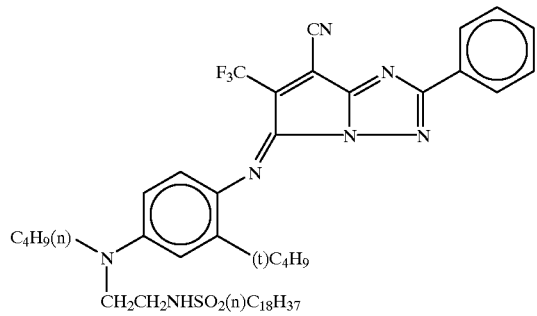
C-7
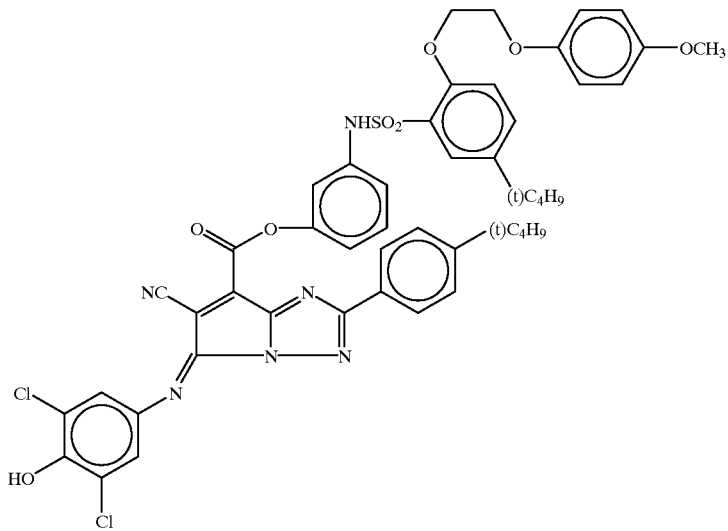

C-8

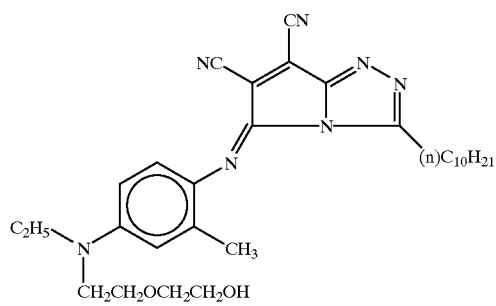

C-9

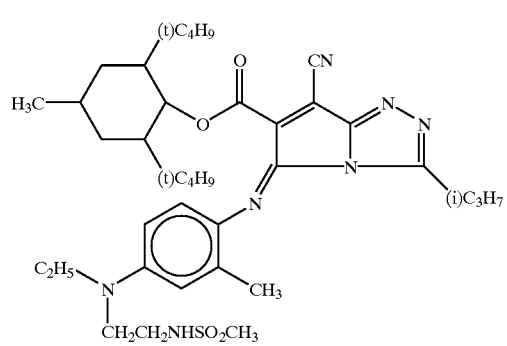

Specific examples of the dyes represented by general formula (II) are disclosed in Japanese Patent Applications Nos. 11-365187 and 11-365188, and in Japanese Patent Application No. 2000-80259 (example compounds D-1 through D-34). However, the dye represented by general formula (II) is not limited to the examples disclosed in these publications.

The dyes represented by general formula (II) can be synthesized with reference to the synthesis methods disclosed in JP-A Nos. 4-126772, 5-177959, 9-292679, 10-62926, 11-158047, Japanese Patent Application Publication (JP-B) No. 7-94180 and the like, and Japanese Patent Application Nos. 11-365187 and 11-365188.

Vinyl Polymer

The vinyl polymer for use in the present invention is a polymer obtained by copolymerizing a monomer A of the following general formula (I) and a monomer B that differs from the monomer A.

General formula (I)

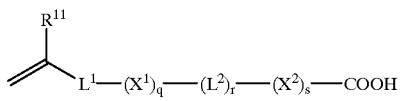

In the general formula (I), $R^{11}$ represents a hydrogen atom, an alkyl group having from 1 to 4 carbon atoms, or a chlorine atom. $L^1$ represents —O—, —COO—, —OCO—, —CONR$^{12}$—, or a substituted or unsubstituted phenylene group. $X^1$ represents —CH$_2$—, —CHR$^{13}$—, —CR$^{13}$R$^{14}$—, —CH$_2$CH$_2$O—, —CH$_2$CHR$^{13}$O—, —CHR$^{13}$CH$_2$O—, a substituted or unsubstituted arylene group, or a substituted or unsubstituted cycloalkylene group. q is 2 or more if $L^1$ is —COO—, but is 1 or more in other cases. $L^2$ represents —O—, —CO—, —COO—, —OCO—, —CONR$^{12}$—, —NR$^{12}$CO—, —NR$^{12}$COO—, or —NR$^{12}$CONR$^{15}$—. r is 0 or 1. $X^2$ represents —CH$_2$—, —CH$_2$CHR$^{13}$—, —CHR$^{13}$CH$_2$—, a substituted or unsubstituted arylene group, or a substituted or unsubstituted cycloalkylene group. s is from 0 to 18. $R^{12}$ and $R^{15}$ each independently represents a hydrogen atom, a substituted or unsubstituted alkyl group, or a substituted or unsubstituted aryl group. $R^{13}$ and $R^{14}$ each independently represents a substituted or unsubstituted alkyl group, or a substituted or unsubstituted aryl group.

Next, the preferred range of the monomer A of the general formula (I) is described.

$R^{11}$ is preferably a hydrogen atom or a methyl group.

$L^1$ is preferably —COO—, —CONR$^{12}$—, or a phenylene group, and more preferably —COO— or —CONH—.

$X^1$ is preferably —CH$_2$—, —CHR$^{13}$—, —CR$^{13}$R$^{14}$—, —CH$_2$CHR$^{13}$O—, or —CHR$^{13}$CH$_2$O—, and more preferably —CH$_2$— or —CH$_2$CH$_2$O—.

When $L^1$ is —COO—, q is preferably from 2 to 25, and more preferably from 2 to 12. In other cases, q is preferably from 1 to 25, and more preferably from 1 to 12.

$L^2$ is preferably —COO—, —OCO—, —CONR$^{12}$—, or —NR$^{12}$CO—, more preferably —COO—, —OCO—, —CONH— or —NHCO—, and even more preferably —OCO— or —NHCO—.

r is preferably 0.

$X^2$ is preferably —CH$_2$—, a substituted or unsubstituted arylene group, or a substituted or unsubstituted cycloalkylene group, more preferably —CH$_2$—, a phenylene group, or an unsubstituted cycloalkylene group, and even more preferably —CH$_2$—, an o-phenylene group, or a 1,2-cycloalkylene group.

s is preferably from 0 to 6, more preferably from 0 to 2. Each of $R^{12}$ and $R^{15}$ is preferably a hydrogen atom, an alkyl group having from 1 to 12 carbon atoms, or a substituted or unsubstituted phenyl group, more preferably a hydrogen atom, an alkyl group having from 1 to 8 carbon atoms, or an unsubstituted phenyl group, and even more preferably a hydrogen atom.

Each of $R^{13}$ and $R^{14}$ is preferably an alkyl group having from 1 to 12 carbon atoms, or a substituted or unsubstituted phenyl group, more preferably an alkyl group having from 1 to 8 carbon atoms, or an unsubstituted phenyl group, and even more preferably a methyl group.

The vinyl polymer may be insoluble in water, dispersible in water (self-emulsifiable in water), or soluble in water. However, the vinyl polymer is preferably a water-dispersible (self-emulsifiable) polymer, in view of productivity and dispersion stability of the coloring particulates containing the vinyl polymer.

The vinyl polymer may have an anionic dissociative group of, for example, carboxylic acid, sulfonic acid, or the like, or the vinyl polymer may have a cationic group such as a tertiary amino group, or a nonionic dispersive group.

The dissociative group that may be in the vinyl polymer is preferably an anionic dissociative group different from groups in the monomer A represented by the general formula (I). It is also preferable to introduce a nonionic dispersive group into the vinyl polymer, for stabilizing the polymer by steric repulsion.

Specific examples of the monomer A represented by the general formula (I) are mentioned below (VM-1 to VM-30). However, the monomer A used in the present invention is not limited to these. Table 1 to 3 are shown as follows.

|  | $R^1$ | $L^1$ | $X^1$ | q | $L^2$ | r | $X^2$ | s |
|---|---|---|---|---|---|---|---|---|
| VM-1 | —CH₃ | —COO— | —CH₂— | 2 | —OCO— | 1 | —CH₂— | 2 |
| VM-2 | —H | —COO— | —CH₂— | 2 | — | 0 | — | 0 |
| VM-3 | —H | —CONH— | —CH₂— | 1 | —OCO— | 1 | —CH₂— | 2 |
| VM-4 | —H | —COO— | —CH₂CH₂O— | 2 | —CO— | 1 | —CH₂— | 2 |
| VM-5 | —CH₃ | —COO— | —CH₂CH₂O— | 2 | — | 0 | —CH₂— | 2 |
| VM-6 | —CH₃ | —COO— | —CH₂— | 2 | —O— | 1 |  | 1 |
| VM-7 | —H | —COO— | —CH₂— | 2 | —OCO— | 1 |  | 1 |
| VM-8 | —CH₃ | —CONH— | —CH₂— | 10 | — | 0 | — | 0 |
| VM-9 | —H | —COO— | —CH₂— | 10 | — | 0 | — | 0 |
| VM-10 | —H | —CONH— | —CH₂— | 3 | — | 0 | — | 0 |
| VM-11 | —CH₃ | —CONH— | —CH₂— | 5 | — | 0 | — | 0 |
| VM-12 | —H | —CONH— | —CH₂— | 2 | — | 0 | — | 0 |
| VM-13 | —H | —CONH— | —CH₂— | 1 | —CONH— | 1 | —CH₂— | 1 |
| VM-14 | —CH₃ | —COO— | —CH₂— | 2 | —O— | 1 |  | 1 |
| VM-15 | —H | —CONH— | 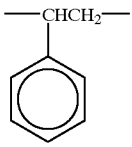 | 1 | — | 0 | — | 0 |
| VM-16 | —H | —COO— | —CH₂— | 4 | —O— | 1 |  | 1 |
| VM-17 | —H | —CONH— | —CH₂— | 1 | — | 0 |  | 1 |
| VM-18 | —CH₃ | —COO— |  | 1 | —OCO— | 1 | —CH₂— | 2 |
| VM-19 | —H | 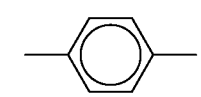 | —CH₂— | 1 | —OCO— | 1 | —CH₂— | 2 |

-continued

| | R¹ | L¹ | X¹ | q | L² | r | X² | s |
|---|---|---|---|---|---|---|---|---|
| VM-20 | —H | —CONH— | —CH₂CH(CH₃)— | 1 | — | 0 | — | 0 |
| VM-21 | —CH₃ | —CONH— | —CH₂— | 2 | —NHCO— | 1 | —CH₂— | 2 |
| VM-22 | —CH₃ | —COO— | —CH₂— | 2 | —NHCONH— | 1 | —CH₂— | 2 |
| VM-23 | —CH₃ | —COO— | —CH₂— | 2 | —NHCOO— | 1 | —CH₂— | 1 |
| VM-24 | —CH₃ | —COO— | —CH₂— | 2 | —OCO— | 1 | 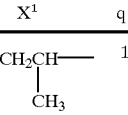 | 1 |
| VM-25 | —CH₃ | —COO— | —CH₂— | 2 | —NHCONH— | 1 | —CH₂— | 11 |
| VM-26 | —H | —CONH— | —CHCH₂— (phenyl) 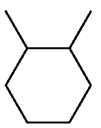 | 1 | —OCO— | 1 | —CH₂— | 2 |
| VM-27 | —H | 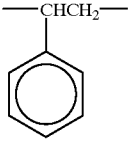 | —CH₂— | 1 | —OCO— | 1 | —CH₂— | 6 |
| VM-28 | —H | —OCO— | —CH₂— | 11 | —OCO— | 1 | —CH₂— | 2 |
| VM-29 | —H | —O— | —CH₂— | 2 | —OCO— | 1 | —CH₂— | 2 |
| VM-30 | —Cl | —COO— | —CH₂— | 2 | — | 0 | — | 0 |

The monomer B includes, for example, acrylates, methacrylates, vinyl esters, acrylamides, methacrylamides, olefins, styrenes, and vinyl ethers.

In the acrylates and methacrylates, the group that forms the ester moiety is preferably an aliphatic group or an aromatic group. For example, more preferred are a methyl group, an ethyl group, an n-propyl group, an isopropyl group, an n-butyl group, an isobutyl group, a sec-butyl group, a tert-butyl group, an amyl group, a hexyl group, a 2-ethylhexyl group, a tert-octyl group, a 2-chloroethyl group, a 4-bromobutyl group, a cyanoethyl group, a 2-acetoxyethyl group, a furfuryl group, a tetrahydrofurfuryl group, a 5-hydroxypentyl group, a cyclohexyl group, a benzyl group, a hydroxymethyl group, a butoxymethyl group, a 3-methoxybutyl group, a 2-(2-methoxyethoxy)ethyl group, a 2-(2-butoxyethoxy)ethyl group, a 2,2,2-trifluoroethyl group, a 1H,1H,2H,2H-perfluorodecyl group, a phenyl group, a 2,4,5-trimethylphenyl group, a 4-chlorophenyl group, and the like.

The vinyl esters are preferably vinyl esters of optionally-substituted aliphatic carboxylic acids. For example, more preferred are vinyl acetate, vinyl propionate, vinyl butyrate, vinyl isobutyrate, vinyl caproate, and vinyl chloroacetate. Also preferred are vinyl esters of optionally-substituted aromatic carboxylic acids; and more preferred are, for example, vinyl benzoate, vinyl 4-methylbenzoate, vinyl salicylate, and the like.

The acrylamides are preferably acrylamide, N-mono-substituted acrylamides and N-di-substituted acrylamides. More preferably, the substituent is any of an aliphatic group, an aromatic group and a silyl group, even more preferably, a methyl group, an ethyl group, an n-propyl group, an isopropyl group, an n-butyl group, a tert-butyl group, a tert-octyl group, a cyclohexyl group, a benzyl group, a hydroxymethyl group, an alkoxymethyl group, a phenyl group, a 2,4,5-trimethylphenyl group, a 4-chlorophenyl group, a trimethylsilyl group, and the like.

The methacrylamides are preferably methacrylamide, N-mono-substituted methacrylamides, and N-di-substituted methacrylamides. More preferably, the substituent is any of an aliphatic group, an aromatic group and a silyl group, even more preferably, a methyl group, an ethyl group, an n-propyl group, an isopropyl group, an n-butyl group, a tert-butyl group, a tert-octyl group, a cyclohexyl group, a benzyl group, a hydroxymethyl group, an alkoxymethyl group, a phenyl group, a 2,4,5-tetramethylphenyl group, a 4-chlorophenyl group, a trimethylsilyl group, and the like.

The olefins are preferably dicyclopentadiene, ethylene, propylene, 1-butene, 1-pentene, vinyl chloride, vinylidene chloride, isoprene, chloroprene, butadiene, 2,3-dimethylbutadiene, and the like.

The styrenes are preferably styrene, methylstyrene, dimethylstyrene, trimethylstyrene, ethylstyrene, isopropylstyrene, chlcoromethylstyrene, methoxystyrene, acetoxystyrene, chlorostyrene, dichlorostyrene, bromostyrene, methyl vinylbenzoate, and the like.

The vinyl ethers are preferably methyl vinyl ether, butyl vinyl ether, hexyl vinyl ether, methoxyethyl vinyl ether, and the like.

Other monomers preferred for the monomer B are butyl crotonate, hexyl crotonate, dimethyl itaconate, dibutyl itaconate, diethyl maleate, dimethyl maleate, dibutyl maleate, diethyl fumarate, dimethyl fumarate, dibutyl fumarate, methyl vinyl ketone, phenyl vinyl ketone, methoxyethyl vinyl ketone, N-vinyloxazolidone, N-vinylpyrrolidone, vinylidene chloride, diphenyl-2- acryloyloxyethyl phosphate, diphenyl-2-methacryloyloxyethyl phosphate, dibutyl-2-acryloyloxyethyl phosphate, dioctyl-2-methacryloyloxyethyl phosphate, and the like.

Monomers having a dissociative group include monomers having an anionic dissociating group, and monomers having a cationic group. Monomers having an anionic dissociating group include, other than the monomer A, for example, carboxylic acid monomers, sulfonic acid monomers, and phosphoric acid monomers.

The carboxylic acid monomers include, for example, acrylic acid, methacrylic acid, itaconic acid, maleic acid, fumaric acid, citraconic acid, crotonic acid, monoalkyl itaconates (e.g., monomethyl itaconate, monoethyl itaconate, monobutyl itaconate, and the like),and monoalkyl maleates (e.g., monomethyl maleate, monoethyl maleate, monobutyl maleate, and the like).

The sulfonic acid monomers include, for example, styrenesulfonic acid, vinylsulfonic acid, acryloyloxyalkanesulfonic acids (e.g., acryloyloxyethanesulfonic acid, acryloyloxypropanesulfonic acid), methacryloyloxyalkanesulfonic acids (e.g., methacryloyloxyethanesulfonic acid, methacryloyloxypropanesulfonic acid, and the like), acrylamidoalkanesulfonic acids (e.g., 2-acrylamido-2-methylethanesulfonic acid, 2-acrylamido-2-methylpropanesulfonic acid, 2-acrylamido-2-methylbutanesulfonic acid, and the like), and methacylamidoalkanesulfonic acids (e.g., 2-methacrylamido-2-methylethanesulfonic acid, 2-methacrylamido-2-methylpropanesulfonic acid, 2-methacrylamido-2-methylbutanesulfonic acid, and the like).

The phosphoric acid monomers include, for example, vinylphosphonic acid, methacryloyloxyethanephosphonic acid, and the like.

Of those, more preferred are acrylic acid, methacrylic acid, styrenesulfonic acid, vinylsulfonic acid, acrylamidoalkylsulfonic acids, and methacrylamidoalkylsulfonic acids; and even more preferred are acrylic acid, methacrylic acid, styrenesulfonic acid, 1-acrylamido-2-methylpropanesulfonic acid, and 2-acrylamido-2-methylbutanesulfonic acid.

Monomers having a cationic group are, for example, monomers having a tertiary amino group, such as dialkylaminoethyl methacrylate, dialkylaminopropyl methacrylate, and the like.

Monomers having a nonionic dispersive group include, for example, esters of polyethylene glycol monoalkyl ethers and carboxylic acid monomers; esters of polyethylene glycol monoalkyl ethers and sulfonic acid monomers; esters of polyethylene glycol monoalkyl ethers and phosphoric acid monomers; vinyl group-having urethanes formed from polyethylene glycol monoalkyl ethers and isocyanate group-having monomers; polyvinyl alcohol structure-having macromonomers; and the like.

The repetition number of ethyleneoxy units in the polyethylene glycol monoalkyl ethers is preferably from 8 to 50, and more preferably from 10 to 30.

The number of carbon atoms constituting an alkyl group in the polyethylene glycol monoalkyl ethers is preferably from 1 to 20, and more preferably from 1 to 12.

For both the vinyl monomer A and the vinyl monomer B, one type or two or more types thereof may be used.

The vinyl monomer A and the vinyl monomer B are selected in accordance with respective objects thereof (e.g., adjustment of the amount of acid contained, adjustment of the glass transition temperature (Tg), adjustment of the solubility into the organic solvent or water, and adjustment of the stability of the dispersion).

The dissociative group content of the vinyl polymer is preferably from 0.2 to 3.0 mmol/g, more preferably between 0.3 and 2.5 mmol/g, even more preferably from 0.5 to 2.0 mmol/g.

If the contained amount of the dissociative group is too small, suitability for emulsification is poor. If the contained amount of the ionic group is dissociative large, the water solubility may be high such that the dispersability of the oil-soluble dye deteriorates.

In the vinyl polymer, the dissociative group may form a salt, combined with an alkali metal ion (e.g., $Na^+$, $K^+$, or the like) or an ammonium ion.

The molecular weight (Mw) of the vinyl polymer is preferably from 1,000 to 200,000, more preferably from 3,000 to 100,000, even more preferably from 5,000 to 80,000, and most preferably from 5,000 to 50,000.

If the molecular weight is lower than 1,000, it is difficult to obtain a stable dispersion.

If the molecular weight exceeds 200,000, the solubility in the organic solvent deteriorates and, even if the vinyl polymer dissolves, the viscosity of the solution increases such that dispersion becomes difficult, which is not preferable.

Specific examples (P-1 through P-43) of the vinyl polymer are given hereinafter.

It is to be noted that the vinyl polymer used in the present invention is not in any way limited to these examples. In the following, ratios are by mass.

Examples of Polymers (Mass Ratio)

P-1) 2-carboxyethyl acrylate/n-butyl methacrylate copolymer (10:90)

P-2) 2-carboxyethyl acrylate/isobutyl methacrylate copolymer (10:90)

P-3) 2-carboxyethyl acrylate/methyl methacrylate/2-ethylhexyl acrylate copolymer (10:45:45)

P-4) 2-carboxyethyl acrylate/t-butyl methacrylate/ethyl acrylate copolymer (9:25:66)

P-5) 2-carboxyethyl acrylate/n-butyl methacrylate/1H,1H,2H,2H-perfluorodecyl acrylate copolymer (10:60:30)

P-6) 2-carboxyethyl acrylate/isobutyl methacrylate/4-methoxybutyl methacrylate copolymer (10:80:10)

P-7) 2-carboxyethyl acrylate/isobutyl methacrylate/2-(2-ethoxyethoxy)ethyl methacrylate copolymer (12:78:10)

P-8) 2-carboxyethyl acrylate/n-butyl methacrylate/polyethylene glycol monomethyl ether (ethyleneoxy chain unit repetitions: 23) methacrylate copolymer (8:77:15)

P-9) 2-carboxyethyl acrylate/hexyl methacrylate/polyethylene glycol monomethyl ether (ethyleneoxy chain unit repetitions: 45) methacrylate copolymer (12:73:15)

P-10) 2-carboxyethyl acrylate/hexyl methacrylate/polyethylene glycol monomethyl ether (ethyleneoxy chain unit repetitions: 90) methacrylate copolymer (12:80:8)

P-11) 2-carboxyethyl acrylate/isobutyl methacrylate/2-hydroxyethyl acrylate copolymer (12:80:8)

P-12) 2-carboxyethyl acrylate/ethyl acrylate/styrene copolymer (10:70:20)

P-13) 2-carboxyethyl acrylate/N-vinylpyrrolidone/n-butyl methacrylate copolymer (10:40:50)

P-14) 2-carboxyethyl acrylate/2,2,2-trifluoroethyl methacrylate/n-butyl methacrylate copolymer (10:30:60)

P-15) 2-carboxyethyl acrylate/n-butyl methacrylate/butoxymethylacrylamide copolymer (10:60:30)

P-16) 2-carboxyethyl acrylate/isobutyl methacrylate/dimethylacrylamide copolymer (10:70:20)

P-17) 2-carboxyethyl acrylate/n-butyl methacrylate/diphenyl-2-methacryloyloxyethyl phosphate copolymer (10:60:30)
P-18) 2-carboxyethyl acrylate/n-butyl methacrylate/phenylacrylamide copolymer (10:60:30)
P-19) 2-carboxyethyl acrylate/butyl acrylate/lauryl methacrylate copolymer (10:80:10)
P-20) 2-carboxyethyl acrylate/tert-butylacrylamide-methyl methacrylate copolymer (10:20:70)
P-21) 2-carboxyethyl acrylate/n-butylmethacrylamide-benzyl methacrylate copolymer (10:20:70)
P-22) 2-carboxyethyl acrylate/n-butyl methacrylate/tetrahydrofurfuryl acrylate copolymer (10:40:50)
P-23) 2-carboxyethyl acrylate/acrylic acid/tetrahydrofurfuryl acrylate copolymer (10:5:85)
P-24) 2-carboxyethyl acrylate/styrenesulfonic acid/n-butyl methacrylate copolymer (10:5:85)
P-25) 2-carboxyethyl acrylate/2-acrylamido-2-methylpropanesulfonic acid/n-butyl methacrylate copolymer (10:5:85)
P-26) 2-carboxyethyl acrylate/2-acrylamido-2-methylbutanesulfonic acid/isobutyl methacrylate copolymer (10:5:85)
P-27) 2-carboxyethyl acrylate/N-vinylimidazole/isobutyl methacrylate copolymer (10:20:70)
P-28) 2-carboxyethyl acrylate/diethylaminoethyl methacrylate/isobutyl methacrylate copolymer (15:10:75)
P-29) 2-carboxyethyl acrylate/diphenylacrylamide/isobutyl methacrylate copolymer (15:10:75)
P-30) 2-carboxyethyl acrylate/n-butylacrylamide/isobutyl methacrylate copolymer (15:10:75)
P-31) N-(3-carboxypropyl)acrylamide/n-butyl methacrylate copolymer (15:85)
P-32) N-(3-carboxypropyl)acrylamide/tert-butylmethacrylamide/butyl acrylate copolymer (12:18:70)
P-33) N-(3-carboxypropyl)acrylamide/isobutyl acrylate/polyethylene glycol monomethyl ether (ethyleneoxy chain unit repetitions: 23) methacrylate copolymer (15:70:15)
P-34) N-(3-carboxypropyl)acrylamide/phenylacrylamide/butyl acrylate copolymer (12:18:70)
P-35) N-(2-carboxy-1-phenylethyl)acrylamide/n-butyl methacrylate copolymer (15:85)
P-36) N-(2-carboxy-1-phenylethyl)acrylamide/butyl methacrylate/polyethylene glycol monomethyl ether (ethyleneoxy chain unit repetitions: 9) methacrylate copolymer (15:70:15)
P-37) N-(2-carboxy-1-phenylethyl)acrylamide/butyl methacrylate/styrene copolymer (15:70:15)
P-38) 4-(4-carboxyphenyloxy)butyl acrylate/acrylic acid/n-butyl methacrylate copolymer (15:5:80)
P-39) mono(p-vinylphenylmethyl)succinate/n-butyl methacrylate copolymer (15:85)
P-40) mono(p-vinylphenylmethyl)succinate/styrene copolymer (15:85)
P-41) mono(p-vinylphenylmethyl)succinate/styrene/methylstyrene copolymer (15:20:65)
P-42) 4-(acryloylaminomethyl)cyclohexanecarboxylic acid/acrylic acid/n-butyl methacrylate copolymer (15:5:80)
P-43) mono(acryloyloxyethyl)succinate/n-butyl methacrylate copolymer (15:85)

Next, an example of a method for preparing the vinyl polymer will be described. However, the vinyl polymer used in the present invention is not limited to the vinyl polymer prepared by the following preparation example. In the following, "parts" means "parts by mass".

<Production Example of Vinyl Polymer>

A mixed solution of 243 parts of n-butyl methacrylate, 27 parts of 2-carboxyethyl acrylate (VM-2), 1.48 parts of 2-mercaptoethanol, 0.80 parts of dimethyl 2,2'-azobis(2-methylpropionate), and 100 parts of IPA was prepared.

Then, 135 parts of methyl ethyl ketone and 0.20 parts of dimethyl 2,2'-azobis(2-methyl)propionate were put into a flask, which was sealed with nitrogen therein. While being stirred, the contents of the flask were heated to 80° C., and the mixed solution was dropwise added thereto over a period of 3 hours. After this addition, 0.2 parts of dimethyl 2,2'-azobis(2-methylpropionate) was added, and this was reacted for a further 5 hours at the same temperature.

A polymer solution thus obtained was concentrated under reduced pressure, and 272 parts of the target vinyl polymer (P-1) was obtained.

The dissociative group content of the vinyl polymer (P-1) was measured by titration, and was 0.69 mmol/g. The weight-average molecular weight of the vinyl polymer (P-1) was 22,500 (measured by GPC, under PS terms).

Production of Color Composition

The color composition of the invention is produced by dispersing coloring particulates containing the oil-soluble dye and the vinyl polymer, in a water-based medium (an aqueous liquid at least containing water). Specific examples are a method in which a dispersion of the vinyl polymer is prepared in advance and this dispersion is impregnated into the oil-soluble dye, a co-emulsification dispersion method, and the like.

Among these, a co-emulsification dispersion method is preferable. An example of a suitable co-emulsification dispersion method is a method in which an organic solvent phase, which contains the vinyl polymer and the oil-soluble dye, is emulsified and made into particulates by either adding water to the organic solvent phase or adding the organic solvent phase into water.

Here, the method by which a dispersion of the vinyl polymer is prepared, and the oil-soluble dye is impregnated into this dispersion will be explained.

A first example of this method includes a first step of preparing a vinyl polymer dispersion; a second step of preparing a dye solution in which the oil-soluble dye is dissolved in an organic solvent; and a third step of preparing a color composition by mixing together the dye solution and the vinyl polymer dispersion.

A second example of this method includes a first step of preparing a vinyl polymer dispersion; a second step of preparing a dye solution in which the oil-soluble dye is dissolved in an organic solvent, and mixing the dye solution together with a liquid containing at least water so as to prepare a dye particulate dispersion solution; and a third step of mixing together the vinyl polymer dispersion and the dye particulate dispersion solution to prepare a color composition.

Next, the co-emulsification dispersion method will be described. A first example of this method includes a first step of preparing a vinyl polymer dye solution in which the oil-soluble dye and the vinyl polymer are dissolved in an organic solvent; and a second step of mixing together the vinyl polymer dye solution and a liquid containing at least water, so as to prepare a color composition.

A second example of this method includes a first step of preparing a dye solution in which the oil-soluble dye is dissolved in an organic solvent; a second step of preparing a vinyl polymer solution in which the vinyl polymer is dissolved; and a third step of mixing together the dye solution and the vinyl polymer solution and a liquid containing at least water, so as to prepare the color composition.

A third example of this method includes a first step of preparing a dye solution in which the oil-soluble dye is dissolved in an organic solvent, and mixing together this dye solution and a liquid containing at least water so as to prepare a dye particulate dispersion solution; a second step of preparing a vinyl polymer solution in which the vinyl polymer is dissolved, and mixing together the vinyl polymer solution with a liquid containing at least water so as to prepare a vinyl polymer particulate dispersion solution; and a third step of mixing together the dye particulate dispersion solution and the vinyl polymer particulate dispersion solution so as to prepare the color composition.

A fourth example of this method includes a first step of preparing a vinyl polymer solution in which the vinyl polymer is dissolved in an organic solvent; a second step of preparing a dye solution in which the oil-soluble dye is dissolved, and mixing together the dye solution with a liquid containing at least water so as to prepare a dye particulate dispersion solution; and a third step of mixing together the vinyl polymer solution and the dye particulate dispersion solution so as to prepare the color composition.

In the color composition, the amount of the vinyl polymer which is used is preferably 10 to 1,000 parts by mass and more preferably 20 to 400 parts by mass with respect to 100 parts by mass of the oil-soluble dye.

If the used amount of the vinyl polymer is less than 10 parts by mass, fine and stable dispersion is difficult.

If the used amount of the vinyl polymer exceeds 1,000 parts by mass, the ratio of the oil-soluble dye within the color composition is small, and there is a lack of leeway in compounding design when the color composition is to be used as an aqueous ink.

In the coloring particulates, it is desirable that the oil-soluble dye is dispersed in the vinyl polymer.

The contained amount of the coloring particulates in the color composition is preferably 1 to 45% by mass, and more preferably 2 to 30% by mass. The contained amount can be appropriately adjusted by dilution, evaporation, ultrafiltration, or the like.

The average particle diameter of the coloring particulates is preferably 1 to 500 nm, more preferably 3 to 300 nm, even more preferably 5 to 150 nm, and particularly preferably 5 to 100 nm. The average particle diameter can be adjusted by centrifugal separation, filtration, or the like.

Organic Solvent

The organic solvent used in preparing the color composition is not particularly limited, and can be appropriately selected on the basis of solubility of the oil-soluble polymer and the vinyl polymer.

Examples of the organic solvent include ketone solvents such as acetone, methylethyl ketone, diethyl ketone, and the like; alcohol solvents such as methanol, ethanol, 2-propanol, 1-propanol, 1-butanol, tert-butanol, and the like; chlorine solvents such as chloroform, methylene chloride, and the like; aromatic solvents such as benzene, toluene, and the like; ester solvents such as ethyl acetate, butyl acetate, isopropyl acetate, and the like; ether solvents such as diethyl ether, tetrahydrofuran, dioxane, and the like; glycol ether solvents such as ethylene glycol monomethyl ether, ethylene glycol dimethyl ether, and the like; and the like.

A single one of these solvents may be used, or two or more of these solvents may be used in combination.

The amount of the organic solvent used is not particularly limited provided that it falls within a range so as not to impair the effects of the present invention. However, the used amount of the organic solvent is preferably 10 to 2,000 parts by mass and more preferably 100 to 1,000 parts by mass with respect to 100 parts by mass of the vinyl polymer.

If the amount of the organic solvent used is less than 10 parts by mass, it is difficult for the coloring particulates to disperse finely and stably. If the used amount of the organic solvent exceeds 2,000 parts by mass, desolvating and concentrating processes for removing the organic solvent are required, and there is a lack of leeway in compounding design.

If the solubility of the organic solvent with respect to water is less than or equal to 10%, or if the vapor pressure of the organic solvent is greater than that of water, it is preferable to remove the organic solvent, from the standpoint of stability of the color composition.

Removal of the organic solvent may be carried out at from 10° C. to 100° C. under a pressure from normal pressure to reduced pressure, and is preferably carried out at from 40 to 100° C. under normal pressure and from 10 to 50° C. under reduced pressure.

Additives

The color composition of the present invention may contain additives which are appropriately selected in accordance with purpose, provided that the additives are contained within a range so as not to impair the effects of the present invention.

Examples of additives include neutralizers, hydrophobic high boiling point organic solvents, dispersing aids, dispersion stabilizers, and the like.

In a case in which the vinyl polymer has an unneutralized dissociative group, a neutralizer can be used appropriately from the standpoints of adjusting the pH of the coloring particulate dispersion, adjusting a self-emulsification property, imparting dispersion stability, and the like.

Examples of neutralizers include organic bases, inorganic alkalis, and the like.

Examples of organic bases include triethanol amine, diethanol amine, N-methyldiethanol amine, dimethylethanol amine, and the like.

Examples of inorganic alkalis include hydroxides of alkali metals (e.g., sodium hydroxide, lithium hydroxide, potassium hydroxide, or the like), carbonates (e.g., sodium carbonate, sodium bicarbonate, or the like), ammonia, and the like.

From the standpoint of improving the dispersion stability of the color composition, the neutralizer is preferably added such that the pH becomes 4.5 to 10.0, and is more preferably added such that the pH becomes 6.0 to 10.0.

The hydrophobic high boiling point organic solvent is used for adjusting the viscosity, specific gravity, printing performance, and the like of the color composition. The hydrophobic high boiling point organic solvent is hydrophobic and preferably has a boiling point of 150° C. or more, and more preferably 170° C. or more. Here, "hydrophobic" means a solubility of 3% or less with respect to distilled water at 25° C. Further, the dielectric constant of the hydrophobic high boiling point organic solvent is preferably 3 to 12, and more preferably 4 to 10. Here, the dielectric constant means relative dielectric constant with respect to a vacuum at 25° C.

As the hydrophobic high boiling point organic solvent, the compounds disclosed in U.S. Pat. No. 2,322,027 and Japanese Patent Application No. 2000-78531 can be used. Specific examples include triester phosphates, diester phthalates, alkyl naphthalenes, ester benzoates and the like. These compounds may be used as either liquid or solid at room temperature, in accordance with the purpose.

The used amount of the hydrophobic high boiling point organic solvent is not particularly limited provided that it is within a range so as not to impair the effects of the present invention. However, an amount of 0 to 1,000 parts by mass, with respect to 100 parts by mass of the vinyl polymer, is preferable and an amount of 0 to 300 parts by mass is more preferable.

A dispersing aid and/or a dispersion stabilizer may be added to any of the vinyl polymer dispersion, the vinyl polymer solution, the dye solution, the liquid containing at least water, and the like. However, it is preferable to add the dispersing aid and/or dispersion stabilizer to the vinyl polymer, the dye solution, or the solution containing water, in a step before the preparation of the vinyl polymer and/or the dye particulate dispersion solution.

Examples of the dispersing aid and dispersion stabilizer are cationic, anionic, and non-ionic surfactants, water-soluble and water-dispersible low molecular weight compounds, oligomers, and the like. The added amount of the dispersing aid or dispersion stabilizer is preferably 0 to 100% by mass, with respect to the total mass of the oil-soluble dye and the vinyl polymer, and more preferably 0 to 20% by mass.

The color composition of the present invention may be used in any field, and is suited for aqueous inks for writing, aqueous printing inks, information recording inks, and the like. The color composition is especially suitably used in the ink for ink-jet recording of the present invention which will be described hereinafter.

<Ink for Ink-jet Recording>

The ink for ink-jet recording of the present invention contains the above-mentioned color composition of the present invention, and other components appropriately selected as necessary.

Other Components

The above-mentioned other components are contained in ranges wherein the effect of the present invention does not disappear.

As the above-mentioned other components, examples include known additives such as a drying prevention agent, permeation promoting agent, ultraviolet ray absorber, antioxidant, anti-fungus agent, pH controlling agent, surface tension controlling agent, defoaming agent, viscosity controlling agent, dispersion stabilizer, rust-prevention agent, chelating agent and the like.

The above-mentioned drying prevention agent is suitably used for the purpose of inhibiting clogging that is due to drying of the above-mentioned ink for ink-jet recording at an ink discharge port of a nozzle used in the ink jet recording method.

As the above-mentioned drying prevention agent, a water-soluble organic solvent having a lower vapor pressure than that of water is preferable, and specific examples thereof include polyhydric alcohols, typified by ethylene glycol, propylene glycol, diethylene glycol, polyethylene glycol, thiodiglycol, dithiodiglycol, 2-methyl-1,3-propanediol, 1,2, 6-hexanetriol, acetylene glycol derivatives, glycerine, trimethylolpropane and the like; lower alkyl ethers of polyhydric alcohol such as ethylene glycol monomethyl (or ethyl) ether, diethylene glycol monomethyl (or ethyl) ether, triethylene glycol monoethyl (or butyl) ether and the like; heterocyclic rings such as 2-pyrrolidone, N-methyl-2-pyrrolidone, 1,3-dimethyl-2-imidazolidinone, N-ethylmorpholine and the like; sulfur-containing compounds such as sulfolane, dimethylsulfoxide, 3-sulfolene and the like; polyfunctional compounds such as diacetone alcohol, diethanolamine and the like; and urea derivatives.

Of these, polyhydric alcohols such as glycerine, diethylene glycol and the like are more preferable. These drying prevention agents may be used alone or in a combination of two or more.

The content of the above-mentioned drying prevention agent in the above-mentioned ink for ink-jet recording is preferably from 10 to 50% by mass.

The above-mentioned permeation promoting agent is suitably used for the purpose of more excellent permeation of the ink for ink-jet recording into paper.

As the above-mentioned permeation promoting agent, there are listed, for example, alcohols such as ethanol, isopropanol, butanol, di(tri)ethylene glycol monobutyl ether, 1,2-hexanediol and the like, sodium laurylsulfate, sodium oleate, and nonionic surfactants and the like.

The above-mentioned permeation promoting agent is contained in an amount in a range wherein blotting of print, passing through paper (print through) and the like do not occur, and usually a sufficient effect is manifested when the permeation promoting agent is contained in an amount of about 5 to 30% by mass in the ink for ink-jet recording.

The above-mentioned ultraviolet ray absorber is used for the purpose of improving storability of images.

As the above-mentioned ultraviolet ray absorber, there are listed, for example, benzotriazole-based compounds described in JP-A Nos. 58-185677, 61-190537, 2-782, 5-197075, 9-34057 and the like, benzophenone-based compounds described in JP-A Nos. 46-2784, 5-194483, U.S. Pat. No. 3,214,463 and the like, cinnamic acid-based compounds described in JP-B Nos. 48-30492, 56-21141, JP-A No. 10-88106 and the like, triazine compounds described in JP-A Nos. 4-298503, 8-53427, 8-239368, 10-182621, 8-501291 (PCT National Publication), and the like, compounds that emit fluorescence when absorbing ultraviolet rays, called fluorescent brighteners, typified by compounds described in Research Disclosure No. 24239, stilbene-based compounds and benzozazole-based compounds, and the like.

The above-mentioned antioxidant is used for the purpose of improving the storability of images.

As the above-mentioned antioxidant, examples that can be used include organic and metal complex-based discoloration preventing agents.

As the above-mentioned organic discoloration preventing agent, examples include hydroquinones, alkoxyphenols, dialkoxyphenols, phenols, anilines, amines, indanes, chromans, alkoxyanilines, heterocyclic rings and the like.

As the above-mentioned metal complex-based discoloration preventing agent, examples include a nickel complex, a zinc complex and the like, and specifically, there can be used compounds described in patents cited in Research Disclosure No. 17643, vol. VII, column I to J, No. 15162, No. 18716, page 650, left column, No. 36544, page 527, No. 307105, page 872 and No. 15162, and compounds included in examples and general formulae of typical compounds described in JP-A No. 62-215272, pp. 127 to 137.

As the above-mentioned anti-fungus agent, examples include dehydro sodium acetate, sodium benzoate, sodiumpyridienthione-1-oxide, ethyl p-hydroxybenzoate, 1,2-benzisothiazoline-3-one and salts thereof are listed. These are preferably used in an amount of 0.02 to 1.00% by mass in an ink.

As the above-mentioned pH controlling agent, the above-mentioned neutralizing agent (organic salt group or inorganic alkali) can be used. The above-mentioned pH controlling agent is added such that the above-mentioned ink for ink-jet recording has a pH preferably of 6 to 10, and more preferably of 7 to 10, for the purpose of improving storage stability of the ink for ink-jet recording.

As the above-mentioned surface tension controlling agent, nonionic, cationic or anionic surfactants are listed as examples.

The surface tension of the ink for ink-jet recording of the present invention is preferably from 25 to 70 mN/m, and more preferably from 25 to 60 mN/m.

The viscosity of the ink for ink-jet recording of the present invention is preferably 30 mPa·s or less, and more preferably 20 mPa·s or less.

As the above-mentioned defoaming agent, fluorine-based compounds and silicone-based compounds, and chelating agents typified by EDTA, and the like can also be used, if necessary.

[Ink-Jet Recording Method]

In the ink-jet recording method of the present invention, recording is carried out onto an image-receiving material by using the above-described ink for ink-jet recording. The ink nozzles and the like used at this time are not particularly limited, and can be selected appropriately in accordance with the purpose.

Image-Receiving Material

The image-receiving material is not particularly limited. Examples thereof are known materials onto which recording is effected, such as regular paper, resin-coated paper, dedicated ink-jet paper, film, paper which can also be used for electrophotography, cloth, glass, metal, ceramics, and the like.

Among these materials onto which recording is effected, dedicated ink-jet paper is preferable, and the papers disclosed in the following publications, for example, are even more preferable: JP-A Nos. 8-169172, 8-27693, 2-276670, 7-276789, 9-323475, 62-238783, 10-153989, 10-217473, 10-235995, 10-337947, 10-217597, 10-337947, and the like.

In the present invention, among the aforementioned image-receiving materials, the following recording papers and recording films are particularly preferable.

The recording paper or recording film has a substrate with an image-receiving layer laminated thereon and, if necessary, has other layers such as a back coat layer and the like laminated thereto.

The layers typically including an image-receiving layer may be used each in a single layer, or in two or more layers.

As the above-mentioned substrate, examples include those made of chemical pulp such as LBKP, NBKP and the like, those made of mechanical pulp such as GP, PGW, RMP, TMP, CTMP, CMP CGP and the like, and those made of waste pulp such as DIP and the like. In the above-mentioned pulp, conventionally known pigments, binders, sizing agents, fixing agents, cationic agents, paper strength reinforcing agents and the like may be added and mixed as necessary. The above-mentioned substrate can be formed by using various apparatuses such as a long net paper machine, round net paper machine or the like.

The above-mentioned substrate may further be synthetic paper, plastic film sheet and the like.

The thickness of the above-mentioned substrate is from about 10 to 250 μm, and the basic weight is desirably from 10 to 250 g/m².

On the substrate, the image-receiving layer, and further the back coat layer selected as necessary, may be directly laminated, or the above-mentioned image-receiving layer and the above-mentioned back coat layer may be provided after a size press or anchor coat layer is formed of starch, polyvinyl alcohol or the like.

Further, on the substrate, a flattening treatment may be performed by a calendering machine such as a machine calender, TG calender, soft calender or the like.

Of the above-mentioned substrates, paper and plastic films laminated on both surfaces with a polyolefin (for example, polyethylene, polystyrene, polyethylene terephthalate, polybutene, or a copolymer thereof) are preferable, and it is more preferable that a white pigment (for example, titanium oxide, zinc oxide) or coloring dyer (for example, cobalt blue, ultramarine, neodymium oxide) is added in the above-mentioned polyolefin.

The above-mentioned image-receiving layer contains a pigment, water-based binder, mordanting agent, water resistant agent, light resistance improving agent, surfactant, and other additives.

As the pigment, a white pigment is preferable.

As the white pigment, there are listed, for example, inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfate, zinc carbonate and the like; and organic pigments such as styrene-based pigments, acrylic pigments, urea resins, melamine resins and the like.

Of these, porous inorganic pigments are preferable, and a synthetic amorphous silica having a large fine pore area or the like is particularly preferable.

As the above-mentioned synthetic amorphous silica, any of anhydrous silic acid obtained by a dry production method and water-containing silic acid obtained by a wet production method can be used, and water-containing silic acid is particularly preferable.

As the above-mentioned water-based binder, there are listed, for example, water-soluble polymers such as polyvinyl alcohol, silanol-modified polyvinyl alcohol, starch, cationized starch, casein, gelatin, carboxymethylcellulose, hydroxyethylcellulose, polyvinylpyrrolidone, polyalkylene oxide, polyalkylene oxide derivatives, and the like; and water-dispersible polymers such as styrene butadiene latex, acryl emulsion and the like.

These may be used alone or in a combination of two or more.

Of these, polyvinyl alcohol and silanol-modified polyvinyl alcohol are preferable from the standpoints of adhesion to the pigment and an anti-peeling property of the image-receiving layer.

The mordanting agent is preferably immobilized and, therefore, a polymer mordanting agent is preferable.

Regarding the above-mentioned polymer mordanting agent, examples are described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, and 1-161236, and U.S. Pat. Nos. 2,484,430, 2,548,564, 3,148,061, 3,309,690, 4,115,124, 4,124,386, 4,193,800, 4,273,853, 4,282,305, and 4,450,224. Polymer mordanting agents described in JP-A No. 1-161236, pp. 212 to 215 are suitably listed as examples. When these polymer mordanting agents are used, an image having excellent image quality is obtained, and light resistance of the image is improved, which is preferable.

The above-mentioned water resistant agent is used for the purpose of rendering an image water-resistant.

A cationic resin is preferable as the water-resistant agent.

As the cationic resin, there are listed, for example, polyamidepolyamineepichlorohydrin, polyethyleneimine, polyamineslfone, dimethyldiallylammonium chloride polymer, cation polyacrylamide and the like. Of these cationic resins, polyamidepolyamineepichlorohydrin is particularly preferable.

The content of the cationic resin is preferably from 1 to 15% by mass, and more preferably from 3 to 10% by mass based on the total solid component of the image-receiving layer.

As the light resistance improving agent, there are listed, for example, zinc sulfate, zinc oxide, hindered amine-based antioxidant, benzotriazole-based ultraviolet ray absorbers such as benzophenone and the like. Of these, zinc sulfate is particularly preferable.

The above-mentioned surfactant functions as a coating aid, peeling property improving agent, sliding property improving agent or antistatic agent.

As the surfactant, those described in JP-A Nos. 62-173463, 62-183457 are listed as examples.

An organic fluoro compound may be used instead of the surfactant.

The above-mentioned fluoro compound is preferably hydrophobic.

The fluoro compound includes, for example, a fluorine surfactant, oily fluorine compound (for example, fluorine oil) and a solid fluorine compound resins (for example, ethylene tetrafluoride resin), and examples include those described in JP-B No. 57-9053 (columns 8 to 17), and JP-A Nos. 61-20994 and 62-135826.

As the above-mentioned other additives, there are listed, for example, pigment dispersing agents, thickening agents, defoaming agents, dyes, fluorescent brighteners, preservatives, pH controlling agents, matting agents, film hardening agents and the like.

The back coat layer contains a white pigment, water-based binder, and other components.

As the white pigment, there are listed, for example, inorganic white pigments such as light calcium carbonate, heavy calcium carbonate, kaolin, talc, clay, calcium sulfate, barium sulfate, titanium dioxide, zinc oxide, zinc sulfate, zinc carbonate, satin white, aluminum silicate, diatomaceous earth, calcium silicate, magnesium silicate, synthetic amorphous silica, colloidal silica, colloidal alumina, pseudo bohemite, aluminum hydroxide, alumina, lithopone, zeolite, water-added halloysite, magnesium carbonate, magnesium hydroxide and the like; and organic pigments such as styrene-based plastic pigments, acrylic plastic pigments, polyethylene, microcapsule, urea resins, melamine resins and the like.

As the above-mentioned water-based binder, there are listed, for example, water-soluble polymers such as styrene/maleic acid salt copolymer, styrene/acrylic acid salt copolymer, polyvinyl alcohol, silanol-modified polyvinyl alcohol, starch, cationized starch, casein, gelatin, carboxymethylcellulose, hydroxyethylcellulose, polyvinylpyrrolidone, and the like; and water-dispersible polymers such as styrene butadiene latex, acryl emulsion and the like.

As the above-mentioned other components, examples include defoaming agents, foaming suppressing agents, dyes, fluorescent brighteners, preservatives, water resistance imparting agents and the like.

A polymer latex may be added to each layer of the above-mentioned recording paper or recording film.

The polymer latex is used for the purpose of improving film physical properties such as dimension stability, curl prevention, adhesion prevention, and film cracking prevention.

As the polymer latex, examples include those described in JP-A Nos. 62-245258, 62-136648 and 62-110066. If a polymer latex having a low glass transition temperature (40° C. or less) is added to a layer containing the above-mentioned mordanting agent, cracking and curl of the layer can be prevented. Further, if a polymer latex having a high glass transition temperature is added to the above-mentioned back coat layer, curl can be prevented.

The ink for ink-jet recording of the present invention can be applied to any ink-jet recording method, and suitably used for, for example, an electric charge controlling method in which ink is discharged by utilizing an electrostatic attracting force, a drop-on-demand method (pressure pulse method) utilizing vibration pressure of a piezo element, an acoustic ink-jet method in which an electric signal is converted into an acoustic beam, ink is irradiated with this beam and the ink is discharged by utilizing radiation pressure, a thermal ink-jet (bubble jet) method in which ink is heated to form bubbles, and generated pressure is utilized, and the like.

The ink-jet recording method includes a method in which an ink having a lower concentration, called a photo ink, is discharged though a lot of ports in small volume, a method in which an image is improved by using a plurality of inks having substantially the same hue and different concentrations, and a method using a colorless, transparent ink.

EXAMPLES

Examples of the present invention will be described hereinafter. However, the present invention is not limited to these Examples. Note that, hereinafter, "parts", "%" and "solid content %" are all by mass unless otherwise indicated.

Example 1

Preparation Example 1
(Preparation of Color Composition (B-1))

To a mixed solution of 4 parts of isopropyl alcohol, 6 parts of tert-butanol, 1.4 parts of vinyl polymer (P-1, having an acid content of 0.69 mmol/g), and 0.6 parts of oil-soluble dye (M-1), 2-mol/l sodium hydroxide was added gradually in an amount such that acid of the vinyl polymer was neutralized. Thereafter, the solution was heated to 80° C. Thereafter, 30 parts of water was added while stirring was carried out. This liquid was condensed at 40° C. under reduced pressure, and a color composition having a solid content of 15% was prepared. The particle diameter of the coloring particulates within the color composition was a volume average diameter of 67 nm (as measured by MICROTRACK UPA 150, manufactured by Nikkiso Co., Ltd.).

Hereinafter, this color composition will be referred to as color composition (B-1).

Preparation Example 2
(Preparation of Color Composition (B-2))

A mixed solution containing 3 parts of ethyl acetate, 0.5 parts of cyclohexanone, 1.4 parts of vinyl polymer (P-3, having an acid content of 0.69 mmol/g), and 0.6 parts of oil-soluble dye (M-6) was prepared. Further, a mixed solution containing 2-mol/l sodium hydroxide in an amount such that the acid of the vinyl polymer would be neutralized, 15 parts of water, and 0.2 parts of bis(2-ethylhexyl) sodium sulfosuccinate was prepared.

The two mixed solutions were combined, and were mixed together and emulsified in a homogenizer. Thereafter, the mixture was concentrated at 40° C. under reduced pressure, and a color composition having a solid content of 15% was prepared. The particle diameter of the coloring particulates within the color composition was a volume average diameter of 56 nm.

Hereinafter, this color composition will be referred to as color composition (B-2).

Preparation Example 3
(Preparation of Color Composition (B-3))

A mixed solution of 5 parts of tetrahydrofuran, 5 parts of tert-butanol, 1.4 parts of vinyl polymer (P-8, having an acid content of 0.55 mmol/g), and 0.6 parts of oil-soluble dye (M-11) was heated to 80° C. Thereafter, 30 parts of water was added while stirring was carried out. This solution was concentrated at 40° C. under reduced pressure, and a color composition having a solid content of 15% was prepared. The particle diameter of the coloring particulates within the color composition was a volume average diameter of 52 nm.

Hereinafter, this color composition will be referred to as color composition (B-3).

Preparation Examples 4 through 9
(Preparation of Color Compositions (B-4) through (B-9))

By a method similar to that of Preparation Example 1, color compositions B-4 through B-7 were prepared. By a method similar to that of Preparation Example 2, color composition B-8 was prepared. By a method similar to that of Preparation Example 3, color composition B-9 was prepared.

The vinyl polymers and oil-soluble dyes which were used are listed in Table 4.

Comparative Preparation Examples 1 and 2
(Preparation of PB-1 and PB-2)

By a method similar to that of Preparation Example 1, PB-1 and PB-2 were prepared. The vinyl polymers and oil-soluble dyes which were used are listed in Table 4.

The polymers used were the following vinyl polymers, which do not contain the monomer A component.
PH-1: n-butyl methacrylate/acrylic acid (95:5) copolymer
PH-2: n-butyl methacrylate/acrylic acid (90:10) copolymer

TABLE 4

| Production Example | Dispersion No. | Vinyl Polymer | Acid Content (mmol/g) | Molecular Weight Mw | Oil-soluble Dye | Particle Size (nm) |
|---|---|---|---|---|---|---|
| 1 | B-1 | P-1 | 0.69 | 22500 | M-1 | 67 |
| 2 | B-2 | P-3 | 0.69 | 34500 | M-6 | 56 |
| 3 | B-3 | P-8 | 0.55 | 32000 | M-11 | 52 |
| 4 | B-4 | P-29 | 1.04 | 13000 | C-1 | 57 |
| 5 | B-5 | P-1, P-20 (blend ratio 1:1) | 0.69 | (Note 1) | C-3 | 67 |
| 6 | B-6 | P-1 | 0.69 | 22500 | C-7 | 69 |
| 7 | B-7 | P-1 | 0.69 | 22500 | M-4 | 43 |
| 8 | B-8 | P-1 | 0.69 | 22500 | M-10 | 45 |
| 9 | B-9 | P-3 | 0.69 | 34500 | M-12 | 59 |
| Comparative: 1 | PB-1 | PH-1 | 0.69 | 24800 | M-1 | Unstatisfactory dispersion |
| Comparative: 2 | PB-2 | PH-2 | 1.39 | 26700 | M-1 | 120 |

Note 1: molecular weight of P-1, 22500; molecular weight of P-20, 26700.

As can be seen from the results of Table 4, when the vinyl polymers of the present invention were used, color compositions in which there was no aggregation and which had small particle diameters could be prepared.

Example 2
Preparation of Ink 01

10 parts of diethylene glycol, 5 parts of glycerin, 0.5 parts of hexaethylene glycol monododecyl ether sulfate sodium salt, 0.5 parts of bis(2-ethylhexyl) sodium sulfosuccinate, and 36 parts of ion exchange water were mixed together with 42 parts of the color composition (B-1) prepared in Preparation Example 1 of Example 1. The mixture was filtered through a 0.45 μm filter, and an aqueous ink 01 for ink-jet recording was prepared.

Preparation of Inks 02 through 09

Aqueous inks 02 through 09 were prepared in the same way as ink 01 was prepared, except that the color composition (B-1) in the above-described preparation of ink 01 was replaced with the color compositions (B-2) through (B-9) prepared in Preparation Examples 2 through 9 of Example 1.

Preparation of Ink 10

6.4 parts of the oil-soluble dye (D-4), 8.0 parts of dioctyl sodium sulfosuccinate, and 19.0 parts of vinyl polymer (P-1, having an acid content of 0.69 mmol/g) were dissolved at 70° C. in 7.7 parts of hydrophobic high boiling point organic solvent (S-1) and 50 parts of ethyl acetate. During the dissolving, 2-mol/l sodium hydroxide was gradually added in an amount such that the acid of the vinyl polymer was neutralized. 500 parts of deionized water was added to this solution while stirring was carried out with a magnetic stirrer, such that an oildrop-in-water type rough particle dispersion was prepared. Next, this rough particulate dispersion was passed five times through a microfluidizer (manufactured by Microfluidex Inc.) at a pressure of 60 MPa (600 bar), so as to change the particles into particulates. Then, the obtained emulsion was desolvated in a rotary evaporator until an ethyl acetate odor disappeared. To this obtained fine emulsion were added 140 parts of diethylene glycol, 50 parts of glycerin, 7 parts of SURFYNOL 465 (manufactured by Air Products and Chemicals, Co.), and 900 parts of deionized water, so as to prepare ink 10 for ink-jet recording.

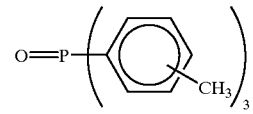

S-1

Preparation of Ink 11

An ink 11 for ink-jet recording was prepared in the same way as ink 01 was prepared, except that the color composition (B-1) in the preparation of ink 01 was replaced with the color composition (PB-2) prepared in Comparative Preparation Example 2 of Example 1.

Image Recording and Evaluation

The prepared inks 01 through 11 were filled into ink-jet printer PM-670C cartridges (manufactured by Epson Co., Ltd.) and, using the same machine, images were recorded onto ink-jet paper photo glossy paper EX (manufactured by Fuji Photo Film Co., Ltd.), and evaluation was carried out as follows. Results of evaluation are given in Table 5.

<Evaluation of Printing Performance ①>

The cartridge was set in the printer and, after ink discharge from all nozzles had been confirmed, images were printed onto twenty sheets of A4-size paper. Disturbance of the printed images was evaluated in accordance with the following criteria.

A: No disturbance of the printed image from the start to the end of printing.

B: Disturbance of the printed image occurred at some times from the start to the end of printing.

C: Disturbance of the printed image from the start to the end of printing.

<Evaluation of Printing Performance ②>

The cartridge was left to stand for 3 days at 50° C. Thereafter, the disturbance of the printed image was evaluated in accordance with the same criteria in the same way as the printing performance ①.

<Evaluation of Dependence on Paper>

The color tone of the image formed on the aforementioned photo glossy paper and the color tone of an image which was formed separately on regular paper for PPC were compared. One of two marks was given. If the difference between the images was slight, a mark of ○ (good) was given. If the difference between the images was great, a mark of X (poor) was given.

<Evaluation of Water Resistance>

The photo glossy paper on which the image was formed was dried for one hour at room temperature, thereafter was immersed in water for 30 seconds, and was left to dry naturally at room temperature, and bleeding thereof was observed. One of three marks was given. Images in which there was no bleeding received a mark of A, images in which there was a slight amount of bleeding received a mark of B, and images in which there was much bleeding received a mark of C.

<Evaluation of Light Resistance>

Using a weathermeter (ATLAS C.I65), the photo glossy paper on which the image was formed was irradiated for three days with xenon light (85,000 1x). Image densities before and after the irradiation with xenon light were measured by using a reflection densitometer (X-RITE 310TR), and a dye remaining rate was evaluated. The reflection density was measured at three points, 1, 1.5 and 2.0.

One of three marks was given. If the dye remaining rate at all of the densities was 80% or more, a mark of A was given, if the dye remaining rate was less than 80% at one or two points, a mark of B was given, and if the dye remaining rate at all of the densities was less than 80%, a mark of C was given.

<Evaluation of Dark Heat Fastness>

After the image was printed, the reflection density was measured by using the X-RITE 310TR before and after storage for 7 days under conditions of 70 to 80% RH. The dye remaining rate was evaluated. The reflection density was measured at three points, 1, 1.5 and 2.0.

One of three marks was given. If the dye remaining rate at all of the densities was 80% or more, a mark of A was given, if the dye remaining rate was less than 80% at one or two points, a mark of B was given, and if the dye remaining rate at all of the densities was less than 80%, a mark of C was given.

As is clear from the results of Table 5, the inks for ink-jet recording of the Examples had sufficiently small particle diameters for inks for ink-jet recording, excellent suitability for printing, excellent color-forming ability and color tone, were not dependent on paper, and had excellent water resistance, light resistance and dark heat fastness.

Example 3

Preparation of Ink Set 101

8 parts of magenta dye (M-6) and 2 parts of vinyl polymer (P-1, having an acid content of 0.69 mmol/g) were dissolved at 70° C. in 6 parts of hydrophobic high boiling point organic solvent (S-1) represented by the following structural formula, 10 parts of hydrophobic high boiling point organic solvent (S-2) represented by the following structural formula, 2.5 parts of dioctyl sodium sulfosuccinate, and 50 parts of ethyl acetate. To this solution was added 500 parts of deionized water while stirring was carried out with a magnetic stirrer, such that an oildrop-in-water type rough particle dispersion was prepared. To this mixed solution, 2-mol/l sodium hydroxide was added until the acid of the vinyl polymer was neutralized.

Then, this rough particulate dispersion was passed five times through a microfluidizer (manufactured by Microfluidex Inc.) at a pressure of 60 MPa (600 bar), so as to change the particles into particulates. Then, the obtained emulsion was desolvated in a rotary evaporator until ethyl acetate odor disappeared, and a light magenta ink was obtained.

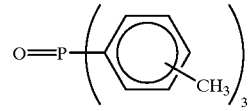

S-1

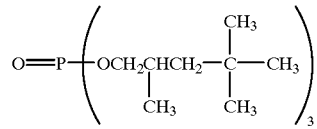

S-2

The oil-soluble dye, the amount of the hydrophobic high boiling point organic solvent, and the amount of SURFYNOL 465 in the preparation of the color composition for light magenta ink were varied as per following Table 6, so

TABLE 5

| Ink No. | Dispersion of Coloring particulates | Print-ability ① | Printa-bility ② | Paper Depen-dency | Water Resis-tance | Light Resis-tance | Dark Heat Fastness | Remarks |
|---|---|---|---|---|---|---|---|---|
| 1 | B-1 | A | A | O | A | A | A | Present invention |
| 2 | B-2 | A | A | O | A | A | A | Present invention |
| 3 | B-3 | A | A | O | A | A | A | Present invention |
| 4 | B-4 | A | A | O | A | A | A | Present invention |
| 5 | B-5 | A | A | O | A | A | A | Present invention |
| 6 | B-6 | A | A | O | A | A | A | Present invention |
| 7 | B-7 | A | A | O | A | A | A | Present invention |
| 8 | B-8 | A | A | O | A | A | A | Present invention |
| 9 | B-9 | A | A | O | A | A | A | Present invention |
| 10 |  | A | A | O | A | A | A | Present invention |
| 11 | PB-2 | B | C | O | A | A | A | Comparative Example | as to prepare an ink set 101 of six types of ink which were, in addition to the light magenta ink, a magenta ink, a light cyan ink, a cyan ink, a yellow ink and a black ink.

The structural formula of the dye (YY-1) used for the yellow ink and the black ink is shown below.

TABLE 6

| Ink Set 101 | Light Magenta Ink | Magenta Ink | Light Cyan Ink | Cyan Ink | Yellow Ink | Black Ink |
|---|---|---|---|---|---|---|
| Dye | M-6 5.00 g | M-6 20.0 g | C-1 9.3 g | C-1 37.2 g | YY-1 27.2 g | M-6 10.0 g C-1 18.6 g YY-1 13.6 g |
| High boiling point Organic Solvent | S-1 3.63 g S-2 6.38 g | S-1 14.52 g S-2 25.52 g | S-1 6.75 g S-2 11.9 g | S-1 27.0 g S-2 47.6 g | S-1 19.74 g S-2 34.7 g | S-1 30.6 g S-2 53.8 g |
| Vinyl Polymer | P-1 1.25 g | P-1 5.0 g | P-1 2.33 g | P-1 9.3 g | P-1 6.8 g | P-1 10.6 g |
| Dioctyl Sodium Sulfosuccinate | 3.13 g | 12.5 g | 11.6 g | 46.4 g | 34.0 g | 52.7 g |
| Diethylene Glycol | 110.0 g | 110.0 g | 110.0 g | 110.0 g | 110.0 g | 110.0 g |
| Urea | 46.0 g | 46.0 g | 46.0 g | 46.0 g | 46.0 g | 46.0 g |
| Glycerin | 50.0 g | 50.0 g | 50.0 g | 50.0 g | 50.0 g | 50.0 g |
| SURFYNOL 465 | 5.5 g | 5.5 g | 5.5 g | 5.5 g | 5.5 g | 5.5 g |
| Triethanolamine | 7.5 g | 7.5 g | 7.5 g | 7.5 g | 7.5 g | 7.5 g |
| Benzotriazole | 0.075 g | 0.075 g | 0.075 g | 0.075 g | 0.075 g | 0.075 g |
| Preservative (PROXEL XL2) | 2.5 g | 2.5 g | 2.5 g | 2.5 g | 2.5 g | 2.5 g |

TABLE 6-continued

| Ink Set 101 | Light Magenta Ink | Magenta Ink | Light Cyan Ink | Cyan Ink | Yellow Ink | Black Ink |
|---|---|---|---|---|---|---|
| Volume-average Particle Size | 28 nm | 32 nm | 30 nm | 37 nm | 38 nm | 47 nm |

YY-1

[Chemical structure of dye YY-1 with chloro-substituted benzene linked via COCCONH and NHCOCHO groups to di-tert-butyl phenyl and methyl-substituted phenyl groups, with an azo (N=N) linkage and a C$_2$H$_5$/CH$_2$CH$_2$NHSO$_2$CH$_3$ amine substituent]

Preparation of Ink Sets 102 to 107

The oil-soluble dyes and the vinyl polymer in the preparation of the ink set 101 were replaced as shown in following Tables 7 and 8, so as to prepare ink sets 102 through 106.

Further, an ink set 107 in accordance with following Table 9 was prepared for comparison as an ink set using water-soluble dyes.

The structural formulas of the dyes (YY-2, MM-2, MM-3, CC-2, CC-3, and A-1 through A-7) used in the ink sets 102 through 107 are shown below.

TABLE 7

| Ink Set | | Light Magenta Ink | Magenta Ink | Light Cyan Ink | Cyan Ink | Yellow Ink | Black Ink | Remarks |
|---|---|---|---|---|---|---|---|---|
| 101 | Dye | M-6 5.00 g | M-6 20.0 g | C-1 9.3 g | C-1 37.2 g | YY-1 27.2 g | M-6 10.0 g C-1 18.6 g YY-1 13.6 g | Example |
| | High boiling point Organic Solvent, S-1/S-2 | 3.63 g/ 6.38 g | 14.52 g/ 25.52 g | 6.75 g/ 11.9 g | 27.0 g/ 47.6 g | 19.7 g/ 34.7 g | 30.6 g/ 53.8 g | |
| | Vinyl Polymer Volume-average Particle Size | P-3 1.25 g 32 nm | P-3 5.0 g 43 nm | P-3 2.23 g 30 nm | P-3 9.3 g 28 nm | P-3 6.8 g 30 nm | P-3 10.6 g 40 nm | |
| 102 | Dye | M-6 5.00 g | M-6 20.0 g | C-1 9.3 g | C-1 37.2 g | YY-1 27.2 g | M-6 10.0 g C-1 18.6 g YY-1 13.6 g | Example |
| | High boiling point Organic Solvent, S-1/S-2 | 3.63 g/ 6.38 g | 14.52 g/ 25.52 g | 6.75 g/ 11.9 g | 27.0 g/ 47.6 g | 19.7 g/ 34.7 g | 30.6 g/ 53.8 g | |
| | Vinyl Polymer Volume-average Particle Size | P-6 1.25 g 42 nm | P-6 5.0 g 50 nm | P-6 2.23 g 43 nm | P-6 9.3 g 55 nm | P-6 6.8 g 60 nm | P-6 10.6 g 82 nm | |
| 103 | Dye | M-6 5.00 g | M-6 20.0 g | C-1 9.3 g | C-1 32.7 g | YY-1 27.2 g | M-6 10.0 g C-1 18.6 g YY-1 13.6 g | Example |
| | High boiling point Organic Solvent, S-1/S-2 | 0.81 g/ 1.42 g | 3.26 g/ 5.73 g | 1.51 g/ 2.66 g | 6.06 g/ 10.7 g | 4.42 g/ 7.77 g | 6.87 g/ 12.1 g | |
| | Vinyl Polymer Volume-average Particle Size | P-8 10.0 g 38 nm | P-8 40.0 g 38 nm | P-8 18.6 g 35 nm | P-8 74.4 g 37 nm | P-8 54.6 g 38 nm | 8P-3 84.4 g 45 nm | |

TABLE 8

| Ink Set | | Light Magenta Ink | Magenta Ink | Light Cyan Ink | Cyan Ink | Yellow Ink | Black Ink | Remarks |
|---|---|---|---|---|---|---|---|---|
| 104 | Dye | MM-2 3.6 g | MM-2 14.4 g | CC-2 17.4 g | CC-2 69.6 g | YY-2 26.5 g | MM-2 6.5 g CC-2 34.8 g YY-2 13.3 g | Example |
| | High boiling point Organic Solvent, S-1/S-2 | 2.6 g/4.6 g | 10.5 g/18.5 g | 12.6 g/22.1 g | 50.5 g/88.7 g | 19.2 g/33.7 g | 39.5 g/69.6 g | |
| | Vinyl Polymer | P-1 0.72 g P-20 0.72 g | P-1 2.88 g P-20 2.88 g | P-1 3.48 g P-20 3.48 g | P-1 13.9 g P-20 13.9 g | P-1 5.3 g P-20 5.3 g | P-1 10.9 g P-20 10.9 g | |
| | Volume-average Particle Size | 29 nm | 30 nm | 32 nm | 43 nm | 40 nm | 52 nm | |
| 105 | Dye | MM-3 3.6 g | MM-3 14.4 g | CC-3 17.4 g | CC-3 69.6 g | YY-2 26.5 g | MM-3 6.5 g CC-3 34.8 g YY-2 13.3 g | Example |
| | High boiling point Organic Solvent, S-1/S-2 | 2.6 g/4.6 g | 10.5 g/18.5 g | 12.6 g/22.1 g | 50.5 g/88.7 g | 19.2 g/33.7 g | 39.6 g/69.6 g | |
| | Vinyl Polymer | P-29 0.9 g | P-29 3.6 g | P-29 4.35 g | P-29 17.4 g | P-29 6.6 g | P-29 13.7 g | |
| | Volume-average Particle Size | 40 nm | 38 nm | 38 nm | 50 nm | 51 nm | 57 nm | |
| 106 | Dye | M-6 5.00 g | M-6 20.0 g | C-1 9.3 g | C-1 32.7 g | YY-1 27.2 g | M-6 10.0 g C-1 18.6 g YY-1 13.6 g | Comparative Example |
| | High boiling point Organic Solvent, S-1/S-2 | 3.63 g/6.38 g | 14.52 g/ 25.52 g | 6.75 g/11.9 g | 27.0 g/47.6 g | 19.7 g/34.7 g | 30.6 g/53.8 g | |
| | Vinyl Polymer | PH-2 1.25 g | PH-2 5.0 g | PH-2 2.33 g | PH-2 9.3 g | PH-2 6.8 g | PH-2 10.6 g | |
| | Volume-average Particle Size | 50 nm | 58 nm | 33 nm | 42 nm | 45 nm | 58 nm | |

-continued

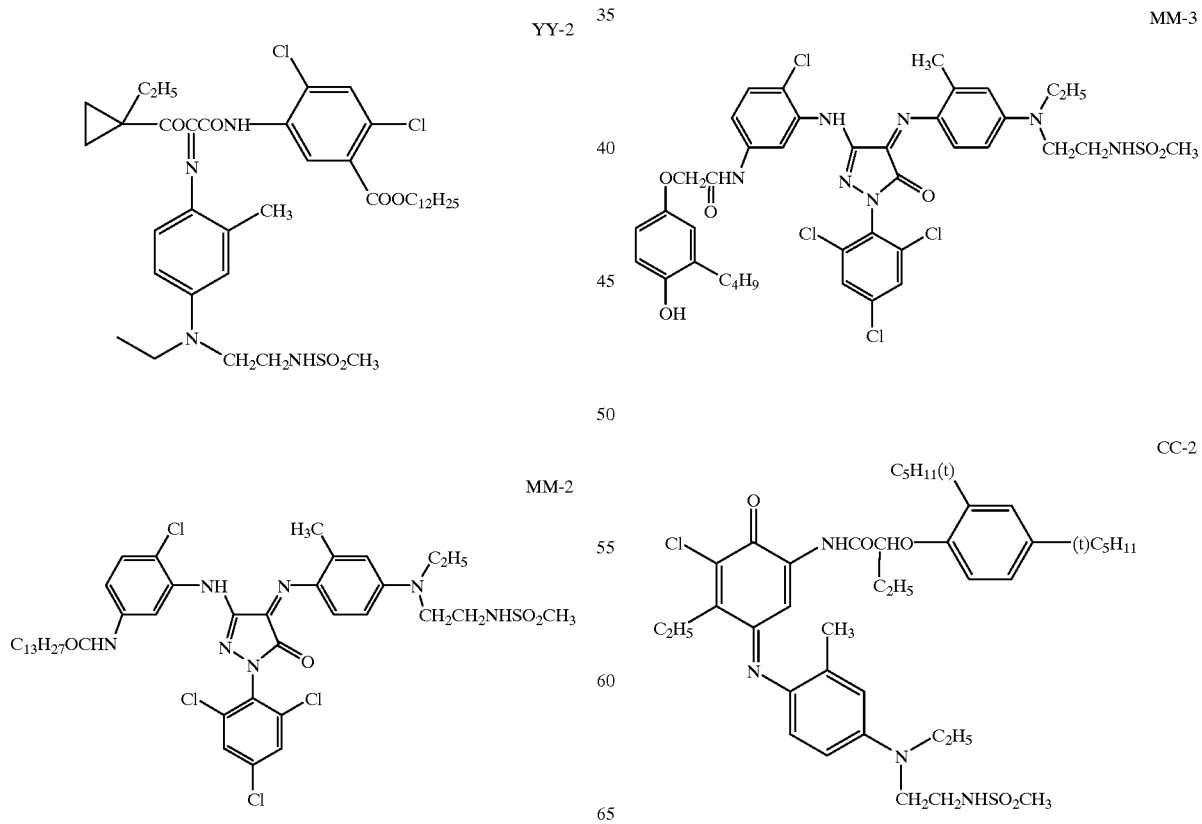

-continued

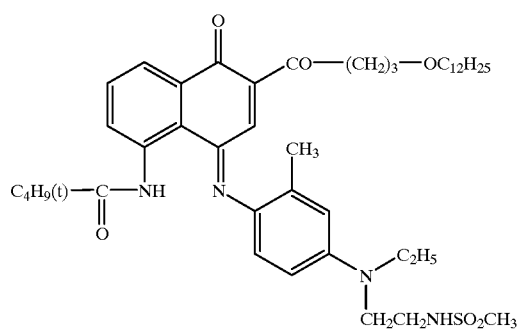

CC-3

TABLE 9

| Ink Set 107 | Light Magenta Ink | Magenta Ink | Light Cyan Ink | Cyan Ink | Yellow Ink | Black Ink |
| --- | --- | --- | --- | --- | --- | --- |
| Dye | A-1 7.0 g | A-1 28.0 g | A-2 8.75 g | A-2 35.0 g | A-3 14.7 g A-4 14.0 g | A-5 20.0 g A-6 20.0 g A-7 20.0 g A-3 21.0 g |
| Diethylene Glycol | 150.0 g | 110.0 g | 130.0 g | 200.0 g | 160.0 g | 20.0 g |
| Urea | 37.0 g | 46.0 g | — | — | — | — |
| Glycerin | 130.0 g | 130.0 g | 150.0 g | 180.0 g | 150.0 g | 120.0 g |

TABLE 9-continued

| Ink Set 107 | Light Magenta Ink | Magenta Ink | Light Cyan Ink | Cyan Ink | Yellow Ink | Black Ink |
| --- | --- | --- | --- | --- | --- | --- |
| Theithylene Glycol Monobutyl Ether | 130.0 g | 140.0 g | 130.0 g | 140.0 g | 130.0 g | — |
| Diethylene Glycol Monobutyl Ether | — | — | — | — | — | 230.0 g |
| 2-Pyrrolidone | — | — | — | — | — | 80.0 g |
| SURFYNOL 456 | 10.5 g | 11.5 g | 11.1 g | 9.8 g | — | — |
| SURFYNOL TG | — | — | — | — | 9.0 g | 8.5 g |
| Treiethanolamine | 6.9 g | 7.4 g | 6.8 g | 6.7 g | 0.8 g | 17.9 g |
| Benzotriazole | 0.08 g | 0.07 g | 0.08 g | 0.08 g | 0.06 g | 0.06 g |
| Preservative (PROXEL XL2) | 3.5 g | 2.5 g | 1.8 g | 2.0 g | 2.5 g | 1.8 g |

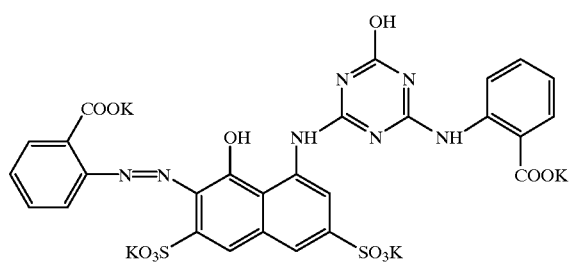

A-1

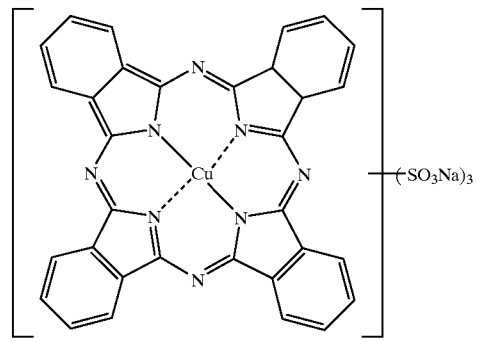

A-2

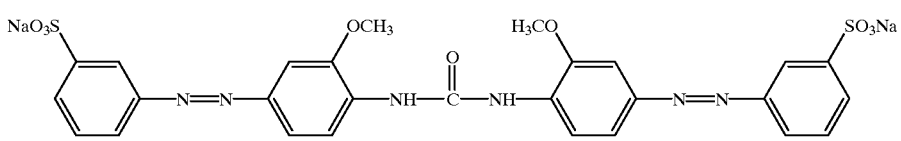

A-3

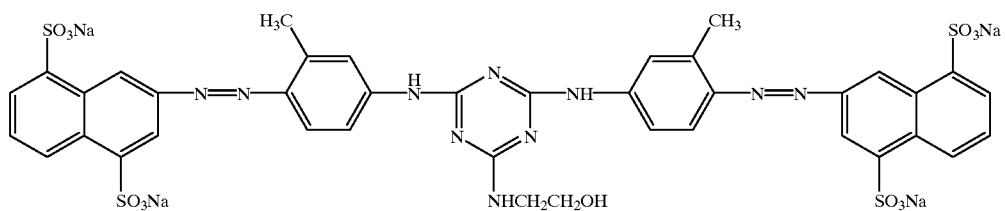

A-4

-continued

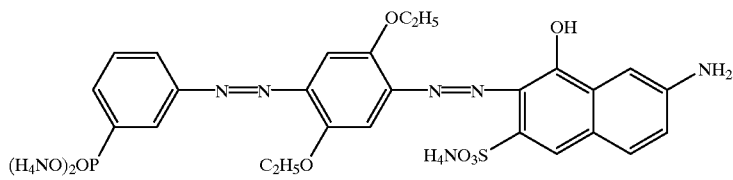

A-5

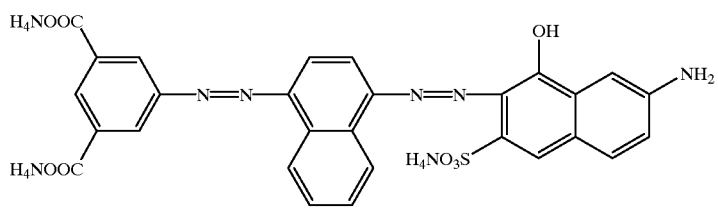

A-6

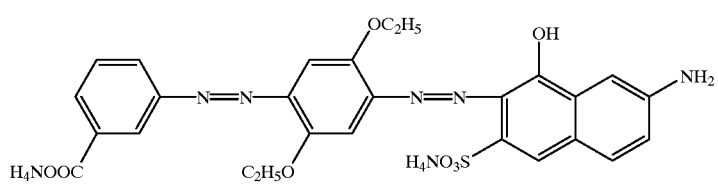

A-7

<Image Recording and Evaluation>

After images were recorded with the prepared ink sets 101 through 107 in the same way as in Example 2, the following evaluations were carried out. The results of evaluation are given in Tables 10 and 11.

<Evaluation of Printing Performance (1)>

Evaluation was carried out in the same manner as in Example 2 in accordance with the same criteria.

<Evaluation of Printing Performance (2)>

Evaluation was carried out in the same manner as in Example 2 in accordance with the same criteria.

Evaluation of Dryability

Immediately after the image was printed, the image portions were touched by a finger, and an amount of smudging was evaluated visually. A mark of ○ means that no smudging occurred.

<Evaluation of Bleeding of Thin Lines>

Yellow, magenta, cyan and black fine line patterns were printed and were evaluated visually. A mark of ○ means that no bleeding was detected, whereas a mark of Δ means that a slight amount of bleeding was confirmed.

<Evaluation of Water Resistance>

Evaluation was carried out in the same manner as in Example 2 in accordance with the same criteria.

<Evaluation of Erasability>

After 30 minutes had elapsed after the image was printed, the image was rubbed with an eraser, and the presence/absence of changes in density of the image portion was evaluated visually. A score of "A" means good results in which hardly any changes in density were detected, and a mark of "B" means poor results in which changes in density were confirmed.

<Evaluation of Dependence on Paper>

Evaluation was carried out in the same manner as in Example 2 in accordance with the same criteria.

<Evaluation of Light Resistance>

Evaluation was carried out in the same manner as in Example 2 in accordance with the same criteria.

<Evaluation of Dark Heat Fastness>

Evaluation was carried out in the same manner as in Example 2 in accordance with the same criteria.

TABLE 10

| Ink Set | Printability (1) | Printability (2) | Dryness | Bleeding of Thin Lines | Water Resistance | Erasability | Paper Dependency | Remarks |
|---|---|---|---|---|---|---|---|---|
| 101 | A | A | ○ | ○ | A | A | ○ | Present invention |
| 102 | A | A | ○ | ○ | A | A | ○ | Present invention |
| 103 | A | A | ○ | ○ | A | A | ○ | Present invention |
| 104 | A | A | ○ | ○ | A | A | ○ | Present invention |
| 105 | A | A | ○ | ○ | A | A | ○ | Present invention |
| 106 | A | C | ○ | ○ | A | A | ○ | Comparative Example |
| 107 | A | A | ○ | Δ | C | A | x | Comparative Example |

TABLE 11

| Ink Set | Light Resistance | | | | Dark Heat Fastness | | | | Remarks |
|---|---|---|---|---|---|---|---|---|---|
| | Y | M | C | BK | Y | M | C | BK | |
| 101 | A | A | A | A | A | A | A | A | Present invention |

TABLE 11-continued

| Ink | Light Resistance | | | | Dark Heat Fastness | | | | Remarks |
|---|---|---|---|---|---|---|---|---|---|
| Set | Y | M | C | BK | Y | M | C | BK | |
| 102 | A | A | A | A | A | A | A | A | Present invention |
| 103 | A | A | A | A | A | A | A | A | Present invention |
| 104 | A | A | A | A | A | A | A | A | Present invention |
| 105 | A | A | A | A | A | A | A | A | Present invention |
| 106 | A | A | A | A | A | A | A | A | Comparative Example |
| 107 | A | C | A | B | A | B | A | A | Comparative Example |

As is clear from the results of Tables 10 and 11, the inks of the present invention had small particle diameter, excellent suitability for printing, no bleeding, excellent color formation and color tone, no dependence on paper, good water resistance and light resistance, and excellent dryability, dark heat fastness and resistance to erasing.

What is claimed is:

1. An ink for ink-jet recording which comprises a color composition prepared by dispersing, in a water-based medium, coloring particulates that contain an oil-soluble dye and a vinyl polymer which is obtained through copolymerization of a vinyl monomer A and a vinyl monomer B that differs from the vinyl monomer A, wherein the vinyl monomer A is represented by general formula (I) as follows:

General formula (I)

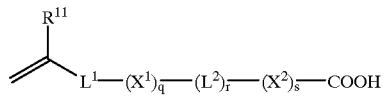

in which in general formula (I): $R^{11}$ represents a hydrogen atom, an alkyl group having from 1 to 4 carbon atoms, or a chlorine atom; $L^1$ represents —O—, —COO—, —OCO—, —CONR$^{12}$—, or a substituted or unsubstituted phenylene group; $X^1$ represents —CH$_2$—, —CHR$^{13}$—, —CR$^{13}$R$^{14}$—, —CH$_2$CH$_2$O—, —CH$_2$CHR$^{13}$O—, —CHR$^{13}$CH$_2$O—, a substituted or unsubstituted arylene group, or a substituted or unsubstituted cycloalkylene group; q is 2 or more if $L^1$ is —COO—, and q is 1 or more in other cases; $L^2$ represents —O—, —CO—, —COO—, —OCO—, —CONR$^{12}$—, —NR$^{12}$CO—, —NR$^2$COO—, or —NR$^{12}$CONR$^{15}$—; r is 0 or 1; $X^2$ represents —CH$_2$—, —CH$_2$CHR$^{13}$—, —CHR$^{13}$CH$_2$—, a substituted or unsubstituted arylene group, or a substituted or unsubstituted cycloalkylene group; s is from 0 to 18; $R^{12}$ and $R^{15}$ each independently represents a hydrogen atom, a substituted or unsubstituted alkyl group, or a substituted or unsubstituted aryl group; and $R^{13}$ and $R^{14}$ each independently represents a substituted or unsubstituted alkyl group or a substituted or unsubstituted aryl group.

2. An ink for ink-jet recording according to claim 1, wherein, in the general formula (I): $R^{11}$ is a hydrogen atom or a methyl group; $L^1$ is —COO—, —CONR$^{12}$—, or a substituted or unsubstituted phenylene group; $X^1$ is —CH$_2$—, —CHR$^{13}$—, —CR$^{13}$R$^{14}$—, —CH$_2$CHR$^{13}$O—, or —CHR$^{13}$CH$_2$O—; q is from 2 to 25 if $L^1$ is —COO—, and q is from 1 to 25 in other cases; $L^2$ is —COO—, —OCO—, —CONR$^{12}$—, or —NR$^{12}$CO—; r is 0; $X^2$ is —CH$_2$—, a substituted or unsubstituted arylene group, or a substituted or unsubstituted cycloalkylene group; s is from 0 to 6; $R^{12}$ and $R^{15}$ each independently represents a hydrogen atom, an alkyl group having from 1 to 12 carbon atoms, or a substituted or unsubstituted phenyl group; and $R^{13}$ and $R^{14}$ each independently represents an alkyl group having from 1 to 12 carbon atoms or a substituted or unsubstituted phenyl group.

3. An ink for ink-jet recording according to claim 1, wherein a contained amount of a dissociative group in the vinyl polymer is from 0.2 to 3.0 mmol/g.

4. An ink for ink-jet recording according to claim 1, wherein the vinyl polymer is a polymer obtained by copolymerizing a monomer represented by the general formula (I) and at least one monomer selected from the group consisting of acrylates, methacrylates, vinyl esters, acrylamides, methacrylamides, olefins, styrenes, vinyl ethers, and derivatives thereof.

5. An ink for ink-jet recording according to claim 1, wherein molecular weight of the vinyl polymer is from 1,000 to 200,000.

6. An ink for ink-jet recording according to claim 1, wherein content of the vinyl polymer in the color composition is from 10 to 1,000 parts by mass, relative to 100 parts by mass of the oil-soluble dye.

7. An ink for ink-jet recording according to claim 1, wherein content of the coloring particulates in the color composition is from 1 to 45% by mass.

8. An ink for ink-jet recording according to claim 1, wherein the oil-soluble dye is represented by general formula (II) as follows:

General formula (II)

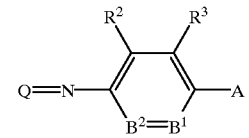

in which general formula (II): Q represents an atomic group which is necessary for the compound represented by the general formula (II) to have absorption in a visible range or in a near-infrared range; A represents —NR$^4$R$^5$ or a hydroxyl group; $R^4$ and $R^5$ each independently represents a hydrogen atom, an alkyl group, an aryl group, or a heterocyclic group; $B^1$ represents =C(R$^6$)— or =N—; $B^2$ represents —C(R$^7$)= or —N=; $R^2$, $R^3$, $R^6$ and $R^7$ each independently represents a hydrogen atom or a substituent; and $R^2$ and $R^3$, $R^3$ and $R^4$, $R^4$ and $R^5$, $R^5$ and $R^6$, and $R^6$ and $R^7$ may be bonded to each other to form rings.

9. An ink for ink-jet recording according to claim 8, wherein Q in the general formula (II) is a group represented by one of the following formulae (Cp-1) to (Cp-28):

(Cp-1)

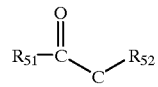

(Cp-2)

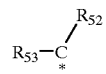

-continued
(Cp-3)
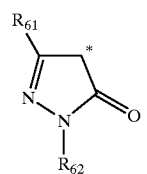
(Cp-4)
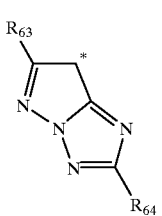
(Cp-5)
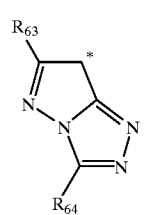
(Cp-6)
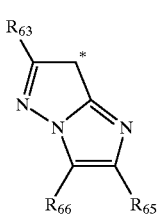
(Cp-7)
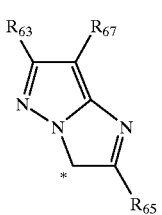
(Cp-8)
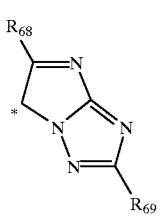
(Cp-9)
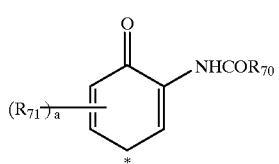
(Cp-10)
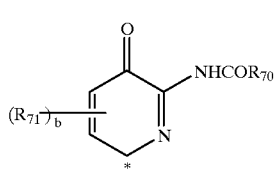
-continued
(Cp-11)
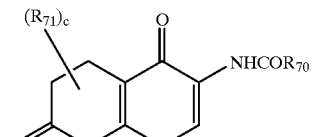
(Cp-12)
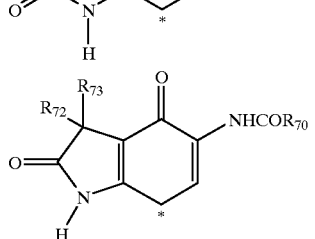
(Cp-13)
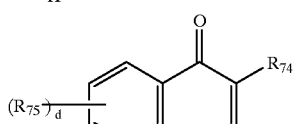
(Cp-14)
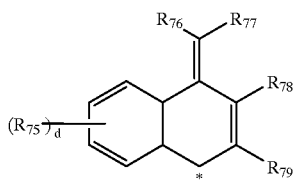
(Cp-15)
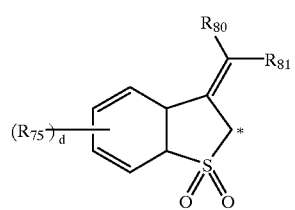
(Cp-16)
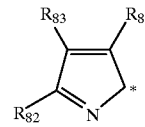
(Cp-17)
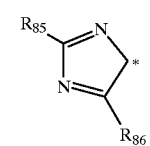
(Cp-18)
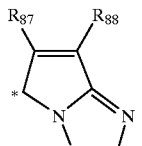
(Cp-19)
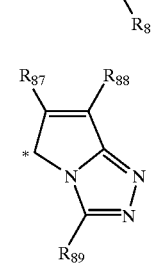

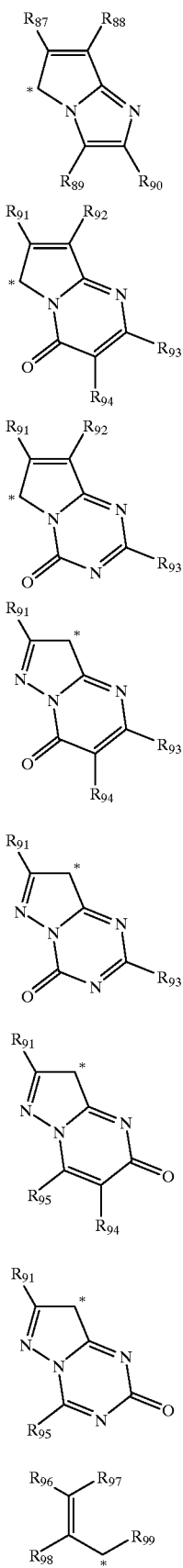

(Cp-20)

(Cp-21)

(Cp-22)

(Cp-23)

(Cp-24)

(Cp-25)

(Cp-26)

(Cp-27)

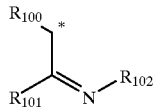

(Cp-28)

in which formula (Cp-1): $R_{51}$ represents an alkyl group, an aryl group, a heterocyclic group, or an alkoxy group; and $R_{52}$ represents a carbamoyl group or a cyano group, in which formula (Cp-2): $R_{53}$ represents an aryl group or a heterocyclic group; and $R_{52}$ has the same meaning as $R_{52}$ in (Cp-1), in which formula (Cp-3): $R_{61}$ represents an alkyl group, an aryl group, a heterocyclic group, an acylamino group, an amino group, an alkoxy group, an aryloxy group, an alkylthio group, an arylthio group, an aminocarbonylamino group, or an alkoxycarbonylamino group; and $R_{62}$ represents an alkyl group, an aryl group, or a heterocyclic group, in which formulae (Cp-4) and (Cp-5): $R_{63}$ and $R_{64}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, or an alkoxycarbonylamino group, in which formulae (Cp-6) and (Cp-7): $R_{63}$ has the same meaning as above; and $R_{65}$, $R_{66}$ and $R_{67}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group, or a carbamoyl group, in which formula (Cp-8): $R_{68}$ and $R_{69}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group, or a carbamoyl group, in which formulae (Cp-9), (Cp-10), (Cp-11) and (Cp-12): $R_{70}$ represents an alkyl group, an aryl group or a heterocyclic group; $R_{71}$ represents a halogen atom, an alkyl group, an aryl group, a heterocyclic group, a silyl group, an acylamino group, an alkyl or arylsulfonylamino group, an amino group, an aminocarbonylamino group, an alkylthio group, an arylthio group, an alkoxy group, or an alkoxycarbonylamino group; $R_{72}$ and $R_{73}$ each represent a hydrogen atom or an alkyl group; a indicates an integer falling between 0 and 3; b indicates an integer falling between 0 and 2; c indicates an integer falling between 0 and 4; and when a, b or c is a plural number, $R_{71}$'s may be the same or different, in which formula (Cp-13): $R_{74}$ represents a carbamoyl group, an alkoxycarbonyl group, a cyano group, a sulfamoyl group, an acylamino group, an aminocarbonylamino group, an alkoxycarbonylamino group, or an alkyl or arylsulfonylamino group; $R_{75}$ represents a halogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, or an alkoxycarbonylamino group; d indicates an integer falling between 0 and 4; and when d is a plural number, $R_{75}$'s may be the same or different, in which formula (Cp-14): $R_{75}$ and d have the same meanings as above; $R_{78}$ and $R_{79}$ have the same meanings as $R_{75}$; and $R_{76}$ and $R_{77}$ each represent a cyano group, a sulfamoyl group, an alkyl or arylsulfonyl group, an acyl group, an alkoxycarbonyl group, or a carbamoyl group, in which formula (Cp-15): $R_{75}$ and d have the same meanings as above; and $R_{80}$ and $R_{81}$ each represent a cyano group, a sulfamoyl group, an alkyl or arylsulfonyl group, an acyl group, an alkoxycarbonyl group, or a carbamoyl group, in which formula (Cp-16): $R_{82}$, $R_{83}$ and $R_{84}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group, or a carbamoyl group, in which formula (Cp-17): $R_{85}$ and $R_{86}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group, or a carbamoyl group, in which formulae (Cp-18) to (Cp-20), $R_{87}$ and $R_{88}$ each represent a carbamoyl group, an alkoxycarbonyl group, an aryloxycarbonyl group, a cyano group, a sulfamoyl group, an alkanesulfonyl group, an arenesulfonyl group, or a nitro group; and $R_{89}$ and $R_{90}$ each represent a hydrogen atom, an alkyl group, an aryl group, or a heterocyclic group, in which formulae (Cp-21) to (Cp-26): $R_{91}$ and $R_{92}$ each represent an alkyl group, an aryl group, a heterocyclic group, a carbamoyl group, an alkoxycarbonyl group, an aryloxycarbonyl group, a cyano group, a sulfamoyl group, an alkanesulfonyl group, an arenesulfonyl group, or a nitro group; and $R_{93}$, $R_{94}$ and $R_{95}$ each represent a hydrogen atom, an alkyl group, an aryl group, a heterocyclic group, an acylamino group, an aminocarbonylamino group, an alkoxycarbonylamino group, an alkyl or arylsulfonylamino group, a halogen atom, an amino group, an alkylthio group, an arylthio group, an alkoxy group, or an aryloxy group, in which formula (Cp-27): $R_{97}$, $R_{98}$ and $R_{99}$ each represent a hydrogen atom, a cyano group, a sulfamoyl group, an alkyl or arylsulfonyl group, an acyl group, an alkoxycarbonyl group, or a carbamoyl group; and $R_{96}$ represents an amino group, an alkylthio group, an arylthio group, an alkoxy group, or an aryloxy group, in which formula (Cp-28): $R_{100}$ and $R_{101}$ each represent a hydrogen atom, a perfluoroalkyl group, a cyano group, a nitro group, a sulfamoyl group, an alkyl or arylsulfonyl group, an acyl group, an alkoxycarbonyl group, a carbamoyl group, an alkylthio group, or an arylthio group; and $R_{102}$ represents an alkyl group, an aryl group, a heterocyclic group, a sulfamoyl group, an alkyl or arylsulfonyl group, an acyl group, an alkoxycarbonyl group, or a carbamoyl group.

10. An ink for ink-jet recording according to claim 9, wherein Q in the general formula (II) is a group represented by one of the formulae (Cp-1), (Cp-2), (Cp-4), (Cp-5), (Cp-11), (Cp-12), (Cp-18), (Cp-21) and (Cp-22).

11. An ink for ink-jet recording according to claim 1, wherein the coloring particulates are prepared by either putting water into an organic solvent phase that contains the oil-soluble dye and the vinyl polymer and emulsifying, or putting the organic solvent phase into water and emulsifying.

12. A color composition which comprises coloring particulates dispersed in a water-based medium, the coloring particulates containing an oil-soluble dye and a vinyl polymer which is obtained through copolymerization of a vinyl monomer A and a vinyl monomer B that differs from the vinyl monomer A, wherein the vinyl monomer A is represented by general formula (I) as follows:

General formula (I)

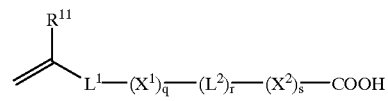

in which in general formula (I): $R^{11}$ represents a hydrogen atom, an alkyl group having from 1 to 4 carbon atoms, or a chlorine atom; $L^1$ represents —O—, —COO—, —OCO—, —CONR$^{12}$—, or a substituted or unsubstituted phenylene group; $X^1$ represents —CH$_2$—, —CHR$^{13}$—, —CR$^{13}$R$^{14}$—, —CH$_2$CH$_2$O—, —CH$_2$CHR$^{13}$O—, —CHR$^{13}$CH$_2$O—, a substituted or unsubstituted arylene group, or a substituted or unsubstituted cycloalkylene group; q is 2 or more if $L^1$ is —COO—, and q is 1 or more in other cases; $L^2$ represents —O—, —CO—, —COO—, —OCO—, —CONR$^{12}$—, —NR$^{12}$CO—, —NR$^2$COO—, or —NR$^{12}$CONR$^{15}$—; r is 0 or 1; $X^2$ represents —CH$_2$—, —CH$_2$CHR$^{13}$—, —CHR$^{13}$CH$_2$—, a substituted or unsubstituted arylene group, or a substituted or unsubstituted cycloalkylene group; s is from 0 to 18; $R^{12}$ and $R^{15}$ each independently represents a hydrogen atom, a substituted or unsubstituted alkyl group, or a substituted or unsubstituted aryl group; and $R^{13}$ and $R^{14}$ each independently represents a substituted or unsubstituted alkyl group or a substituted or unsubstituted aryl group.

and wherein the oil-soluble dye is represented by general formula (II) as follows:

General formula (II)

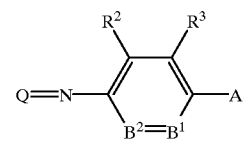

in which in general formula (II): Q represents an atomic group which is necessary for the compound represented by the general formula (II) to have absorption in a visible range or in a near-infrared range; A represents —NR$^4$R$^5$ or a hydroxyl group; $R^4$ and $R^5$ each independently represents a hydrogen atom, an alkyl group, an aryl group, or a heterocyclic group; $B^1$ represents =C(R$^6$)— or =N—; $B^2$ represents —C(R$^7$)= or —N=; $R^2$, $R^3$, $R^6$ and $R^7$ each independently represents a hydrogen atom or a substituent; and $R^2$ and $R^3$, $R^3$ and $R^4$, $R^4$ and $R^5$, $R^5$ and $R^6$, and $R^6$ and $R^7$ may be bonded to each other to form rings.

13. An ink-jet recording method, in which recording is carried out using an ink for ink-jet recording which includes a color composition prepared by dispersing, in a water-based medium, coloring particulates that contain an oil-soluble dye and a vinyl polymer which is obtained through copolymerization of a vinyl monomer A and a vinyl monomer B that differs from the vinyl monomer A, wherein the vinyl monomer A is represented by general formula (I) as follows:

General formula (I)

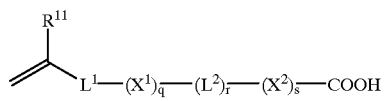

in which in general formula (I): $R^{11}$ represents a hydrogen atom, an alkyl group having from 1 to 4 carbon atoms, or a chlorine atom; $L^1$ represents —O—, —COO—, —OCO—, —CONR$^{12}$—, or a substituted or unsubstituted phenylene group; $X^1$ represents —CH$_2$—, —CHR$^{13}$—, —CR$^{13}$R$^{14}$—, —CH$_2$CH$_2$O—, —CH$_2$CHR$^{13}$O—, —CHR$^{13}$CH$_2$O—, a substituted or unsubstituted arylene group, or a substituted or unsubstituted cycloalkylene group; q is 2 or more if $L^1$ is —COO—, and q is 1 or more in other cases; $L^2$ represents —O—, —CO—, —COO—, —OCO—, —CONR$^{12}$—, —NR$^{12}$CO—, —NR$^{12}$COO—, or —NR$^{12}$CONR$^{15}$—; r is 0 or 1; $X^2$ represents —CH$_2$—, —CH$_2$CHR$^{13}$—, —CHR$^{13}$CH$_2$—, a substituted or unsubstituted arylene group, or a substituted or unsubstituted cycloalkylene group; s is from 0 to 18; $R^{12}$ and $R^{15}$ each independently represents a hydrogen atom, a substituted or unsubstituted alkyl group, or a substituted or unsubstituted aryl group; and $R^{13}$ and $R^{14}$ each independently represents a substituted or unsubstituted alkyl group or a substituted or unsubstituted aryl group.

14. An ink-jet recording method according to claim 13, wherein a contained amount of a dissociative group in the vinyl polymer is from 0.2 to 3.0 mmol/g.

15. An ink-jet recording method according to claim 13, wherein the oil-soluble dye is represented by general formula (II) as follows:

General formula (II)

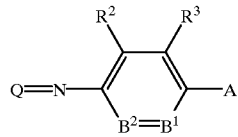

in which general formula (II): Q represents an atomic group which is necessary for the compound represented by the general formula (II) to have absorption in a visible range or in a near-infrared range; A represents —NR$^4$R$^5$ or a hydroxyl group; $R^4$ and $R^5$ each independently represents a hydrogen atom, an alkyl group, an aryl group, or a heterocyclic group; $B^1$ represents =C(R$^6$)— or =N—; $B^2$ represents —C(R$^7$)= or —N=; $R^2$, $R^3$, $R^6$ and $R^7$ each independently represents a hydrogen atom or a substituent; and $R^2$ and $R^3$, $R^3$ and $R^4$, $R^4$ and $R^5$, $R^5$ and $R^6$, and $R^6$ and $R^7$ may be bonded to each other to form rings.

16. An ink-jet recording method according to claim 15, wherein Q in the general formula (II) is a group represented by one of the following formulae (Cp-1) to (Cp-28):

(Cp-1)

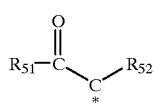

(Cp-2)

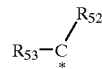

(Cp-3)

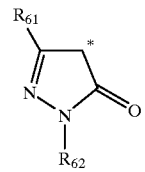

(Cp-4)

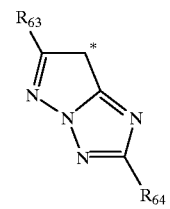

(Cp-5)

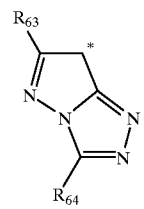

(Cp-6)

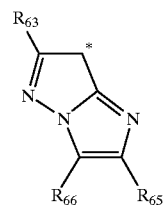

(Cp-7)

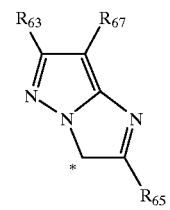

(Cp-8)

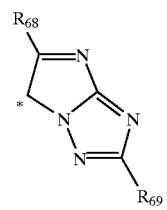

(Cp-9)

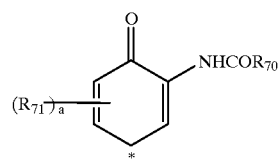

(Cp-10) 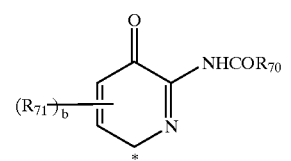
(Cp-11) 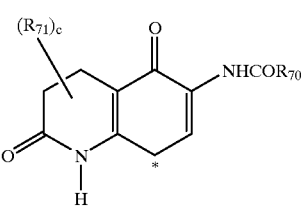
(Cp-12) 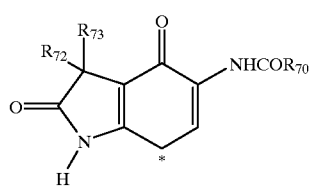
(Cp-13) 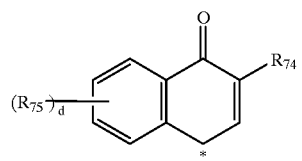
(Cp-14) 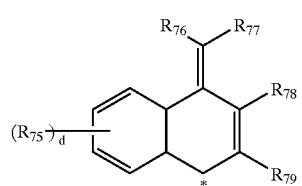
(Cp-15) 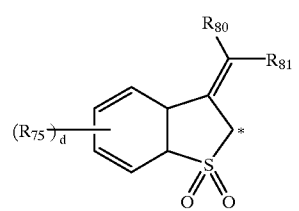
(Cp-16) 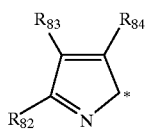
(Cp-17) 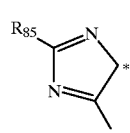
(Cp-18) 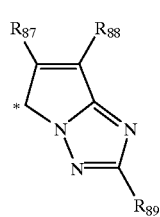
(Cp-19) 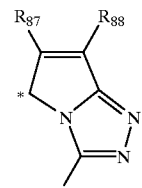
(Cp-20) 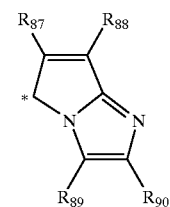
(Cp-21) 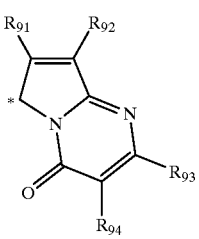
(Cp-22) 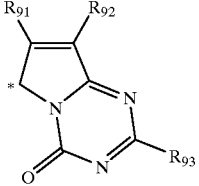
(Cp-23) 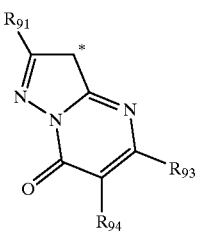
(Cp-24) 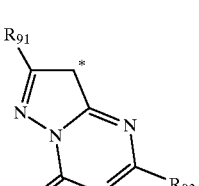
(Cp-25) 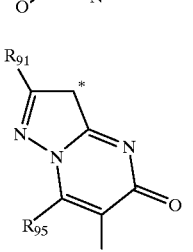

-continued

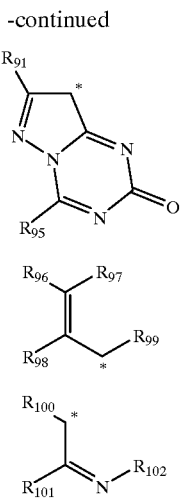

(Cp-26)

(Cp-27)

(Cp-28)

in which formula (Cp-1): $R_{51}$ represents an alkyl group, an aryl group, a heterocyclic group, or an alkoxy group; and $R_{52}$ represents a carbamoyl group or a cyano group, in which formula (Cp-2): $R_{53}$ represents an aryl group or a heterocyclic group; and $R_{52}$ has the same meaning as $R_{52}$ in (Cp-1), in which formula (Cp-3): $R_{61}$ represents an alkyl group, an aryl group, a heterocyclic group, an acylamino group, an amino group, an alkoxy group, an aryloxy group, an alkylthio group, an arylthio group, an aminocarbonylamino group, or an alkoxycarbonylamino group; and $R_{62}$ represents an alkyl group, an aryl group, or a heterocyclic group, in which formulae (Cp-4) and (Cp-5): $R_{63}$ and $R_{64}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, or an alkoxycarbonylamino group, in which formulae (Cp-6) and (Cp-7): $R_{63}$ has the same meaning as above; and $R_{65}$, $R_{66}$ and $R_{67}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group, or a carbamoyl group, in which formula (Cp-8): $R_{68}$ and $R_{69}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group, or a carbamoyl group, in which formulae (Cp-9), (Cp-10), (Cp-11) and (Cp-12): $R_{70}$ represents an alkyl group, an aryl group or a heterocyclic group; $R_{71}$ represents a halogen atom, an alkyl group, an aryl group, a heterocyclic group, a silyl group, an acylamino group, an alkyl or arylsulfonylamino group, an amino group, an aminocarbonylamino group, an alkylthio group, an arylthio group, an alkoxy group, or an alkoxycarbonylamino group; $R_{72}$ and $R_{73}$ each represent a hydrogen atom or an alkyl group; a indicates an integer falling between 0 and 3; b indicates an integer falling between 0 and 2; c indicates an integer falling between 0 and 4; and when a, b or c is a plural number, $R_{71}$'s may be the same or different, in which formula (Cp-13): $R_{74}$ represents a carbamoyl group, an alkoxycarbonyl group, a cyano group, a sulfamoyl group, an acylamino group, an aminocarbonylamino group, an alkoxycarbonylamino group, or an alkyl or arylsulfonylamino group; $R_{75}$ represents a halogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, or an alkoxycarbonylamino group; d indicates an integer falling between 0 and 4; and when d is a plural number, $R_{75}$'s may be the same or different, in which formula (Cp-14): $R_{75}$ and d have the same meanings as above; $R_{78}$ and $R_{79}$ have the same meanings as $R_{75}$; and $R_{76}$ and $R_{77}$ each represent a cyano group, a sulfamoyl group, an alkyl or arylsulfonyl group, an acyl group, an alkoxycarbonyl group, or a carbamoyl group, in which formula (Cp-15): $R_{75}$ and d have the same meanings as above; and $R_{80}$ and $R_{81}$ each represent a cyano group, a sulfamoyl group, an alkyl or arylsulfonyl group, an acyl group, an alkoxycarbonyl group, or a carbamoyl group, in which formula (Cp-16): $R_{82}$, $R_{83}$ and $R_{84}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group, or a carbamoyl group, in which formula (Cp-17): $R_{85}$ and $R_{86}$ each represent a hydrogen atom, an alkyl group, an aryl group, a heterocyclic group, an acylamino group, an alkyl or arylsulfonylamino group, an amino group, an alkylthio group, an arylthio group, an alkoxy group, an aryloxy group, an aminocarbonylamino group, an alkoxycarbonylamino group, an acyl group, an alkoxycarbonyl group, or a carbamoyl group, in which formulae (Cp-18) to (Cp-20), $R_{87}$ and $R_{88}$ each represent a carbamoyl group, an alkoxycarbonyl group, an aryloxycarbonyl group, a cyano group, a sulfamoyl group, an alkanesulfonyl group, an arenesulfonyl group, or a nitro group; and $R_{89}$ and $R_{90}$ each represent a hydrogen atom, an alkyl group, an aryl group, or a heterocyclic group, in which formulae (Cp-21) to (Cp-26): $R_{91}$ and $R_{92}$ each represent an alkyl group, an aryl group, a heterocyclic group, a carbamoyl group, an alkoxycarbonyl group, an aryloxycarbonyl group, a cyano group, a sulfamoyl group, an alkanesulfonyl group, an arenesulfonyl group, or a nitro group; and $R_{93}$, $R_{94}$ and $R_{95}$ each represent a hydrogen atom, an alkyl group, an aryl group, a heterocyclic group, an acylamino group, an aminocarbonylamino group, an alkoxycarbonylamino group, an alkyl or arylsulfonylamino group, a halogen atom, an amino group, an alkylthio group, an arylthio group, an alkoxy group, or an aryloxy group, in which formula (Cp-27): $R_{97}$, $R_{98}$ and $R_{99}$ each represent a hydrogen atom, a cyano group, a sulfamoyl group, an alkyl or arylsulfonyl group, an acyl group, an alkoxycarbonyl group, or a carbamoyl group; and $R_{96}$ represents an amino group, an alkylthio group, an arylthio group, an alkoxy group, or an aryloxy group, in which formula (Cp-28): $R_{100}$ and $R_{101}$ each represent a hydrogen atom, a perfluoroalkyl group, a cyano group, a nitro group, a sulfamoyl group, an alkyl or arylsulfonyl group, an acyl group, an alkoxycarbonyl group, a carbamoyl group, an alkylthio group, or an arylthio group; and $R_{102}$ represents an alkyl group, an aryl group, a heterocyclic group, a sulfamoyl group, an alkyl or arylsulfonyl group, an acyl group, an alkoxycarbonyl group, or a carbamoyl group.

17. An ink-jet recording method according to claim 16, wherein Q in the general formula (II) is a group represented by one of the formulae (Cp-1), (Cp-2), (Cp-4), (Cp-5), (Cp-11), (Cp-12), (Cp-18), (Cp-21) and (Cp-22).

18. An ink-jet recording method according to claim 13, wherein the coloring particulates are prepared by either putting water into an organic solvent phase that contains the oil-soluble dye and the vinyl polymer and emulsifying, or putting the organic solvent phase into water and emulsifying.

* * * * *